United States Patent
Prebble

(10) Patent No.: US 11,100,355 B1
(45) Date of Patent: Aug. 24, 2021

(54) DOCUMENT IMAGE CONTENT PROTECTION IN THE CONTEXT OF NOISE REDUCTION

(71) Applicant: Konica Minolta Business Solutions U.S.A., Inc., San Mateo, CA (US)

(72) Inventor: Tim Prebble, Longmont, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 0 days.

(21) Appl. No.: 16/830,401

(22) Filed: Mar. 26, 2020

(51) Int. Cl.
*G06K 9/40* (2006.01)
*G06K 9/00* (2006.01)

(52) U.S. Cl.
CPC .......... *G06K 9/40* (2013.01); *G06K 9/00456* (2013.01); *G06K 9/00463* (2013.01); *G06K 9/00469* (2013.01)

(58) Field of Classification Search
CPC .......... G06K 9/00456; G06K 9/00463; G06K 9/00469; G06K 9/40
See application file for complete search history.

(56) References Cited

U.S. PATENT DOCUMENTS

| | | | |
|---|---|---|---|
| 8,457,426 B1 * | 6/2013 | Agrawal | G06K 9/00456 382/237 |
| 2014/0056536 A1 | 2/2014 | Zamyatin et al. | |

* cited by examiner

*Primary Examiner* — Daniel G Mariam
(74) *Attorney, Agent, or Firm* — Osha Bergman Watanabe & Burton LLP

(57) ABSTRACT

A method, non-transitory computer readable medium, and system to reduce visual background noise in an image, especially in images of document pages, without destroying and/or deteriorating the content of that image. In particular, natural images, filled and stroked vector graphics, and text are protected from being destroyed and/or deteriorated by the noise removal process.

20 Claims, 23 Drawing Sheets

Selected CCs B 306b

DOCUMENT IMAGE CONTENT PROTECTION IN THE CONTEXT OF NOISE REDUCTION

BACKGROUND

Document scanners and camera devices capture images of documents (herein referred to as "document images"). In such document images, image noise generated by image sensors and circuitry of the document scanners and camera devices exists as random variation of brightness or color information.

The background of a document image is a portion that excludes foreground objects (e.g., text, graphics, charts, tables, pictures, and/or other embedded contents) within the document image. In other words, the background and the foreground objects are mutually exclusive portions where the foreground objects are defined as content or more specifically non-background content. Background noise is the image noise in the background of these document images.

SUMMARY

In general, in one aspect, the invention relates to a method to reduce background noise in a document image. The method includes generating, by a computer processor and from the document image, an original mask and an inverse mask of the document image, extracting, by the computer processor and from the original mask, a plurality of original connected components, extracting, by the computer processor and from the inverse mask, a plurality of inverse connected components, generating, by the computer processor and based on the plurality of original connected components and the plurality of inverse connected component, a plurality of combined connected components, generating, from the plurality of combined connected components and based on a predetermined criterion, a plurality of selected connected components corresponding to a selected protection area of the document image to be excluded from pixel value conversion, generating, based at least on the plurality of selected connected components, a content mask for the pixel value conversion, identifying, based at least on the content mask, at least one noise pixel, generating a final image by at least converting the pixel value of the at least one noise pixel to a uniform background color, and outputting the final image.

In general, in one aspect, the invention relates to a system for reducing background noise in a document image, The system includes a memory, and a computer processor connected to the memory and that generates, from the document image, an original mask and an inverse mask of the document image, extracts, from the original mask, a plurality of original connected components, extracts, from the inverse mask, a plurality of inverse connected components, generates, based on the plurality of original connected components and the plurality of inverse connected component, a plurality of combined connected components, generates, from the plurality of combined connected components and based on a predetermined criterion, a plurality of selected connected components corresponding to a selected protection area of the document image to be excluded from pixel value conversion, generates, based at least on the plurality of selected connected components, a content mask for the pixel value conversion, identifies, based at least on the content mask, at least one noise pixel, generates a final image by at least converting the pixel value of the at least one noise pixel to a uniform background color, and outputs the final image.

In general, in one aspect, the invention relates to a non-transitory computer readable medium (CRM) storing computer readable program code for reducing background noise in a document image. The computer readable program code, when executed by a computer, includes functionality for generating, from the document image, an original mask and an inverse mask of the document image, extracting, from the original mask, a plurality of original connected components, extracting, from the inverse mask, a plurality of inverse connected components, generating, based on the plurality of original connected components and the plurality of inverse connected component, a plurality of combined connected components, generating, from the plurality of combined connected components and based on a predetermined criterion, a plurality of selected connected components corresponding to a selected protection area of the document image to be excluded from pixel value conversion, generating, based at least on the plurality of selected connected components, a content mask for the pixel value conversion, identifying, based at least on the content mask, at least one noise pixel, generating a final image by at least converting the pixel value of the at least one noise pixel to a uniform background color, and outputting the final image.

Other aspects of the invention will be apparent from the following description and the appended claims.

DETAILED DESCRIPTION

Figure 1:
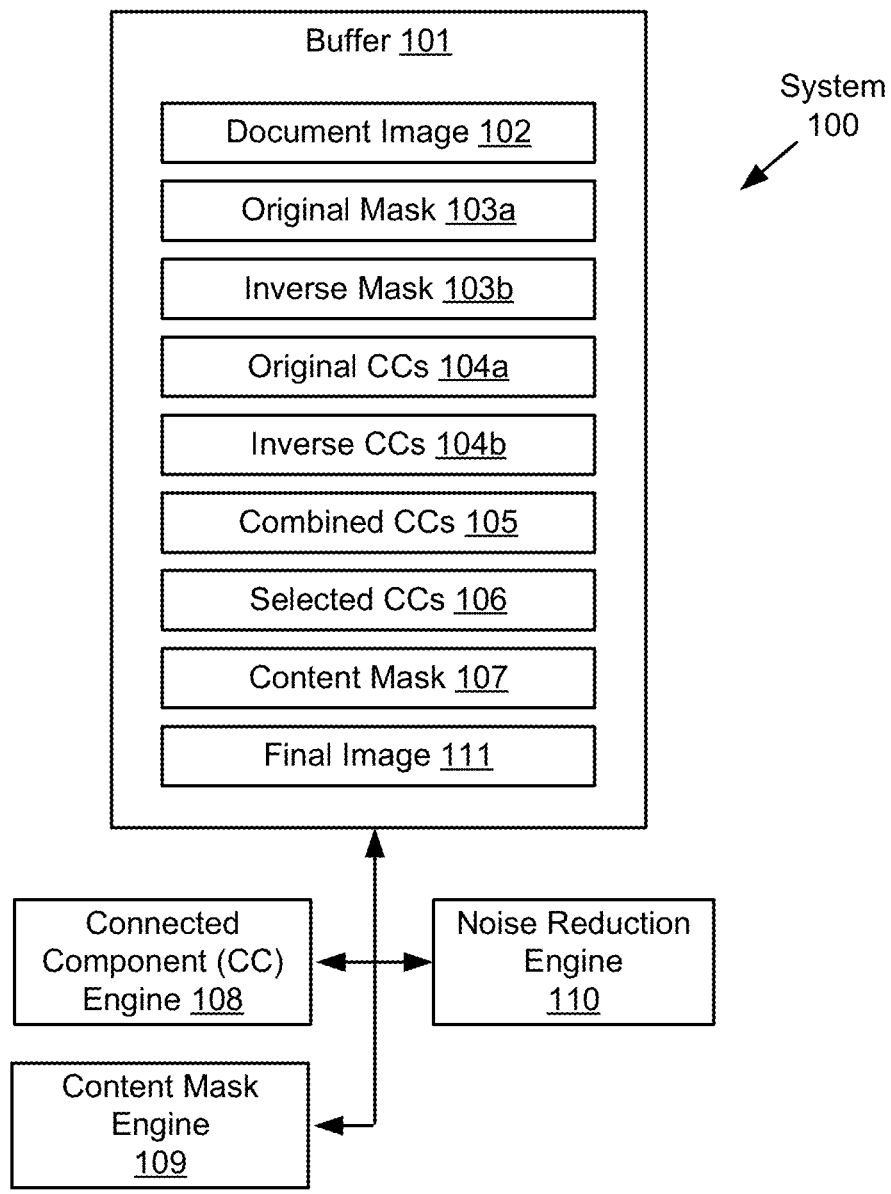
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, non-transitory computer readable medium, and system to reduce visual background noise in an image (especially in images of document pages) without destroying and/or deteriorating the content of that image. In particular, natural images, filled and stroked vector graphics, and text are protected from being destroyed and/or deteriorated by the noise removal (cleaning) process.

FIG. 1 shows a system (100) in accordance with one or more embodiments of the invention. As shown in FIG. 1, the system (100) has multiple components, including, for example, a buffer (101), a connected component (CC)

engine (108), a content mask engine (109), and a noise reduction engine (110). Each of these components (101, 108, 109, 110) may be located on the same computing device (e.g., personal computer (PC), laptop, tablet PC, smart phone, multifunction printer, kiosk, server, etc.) or on different computing devices connected by a network of any size having wired and/or wireless segments. In one or more embodiments, these components may be implemented using the computing system (500) described below in reference to FIG. 5. Each of these components is discussed below.

In one or more embodiments, the buffer (101) may be implemented in hardware (i.e., circuitry), software, or any combination thereof. The buffer (101) is configured to store a document image (102). The document image (102) is an image of a physical document and may be captured from a physical document using a camera device or a document scanner. The physical document includes one or more lines of text made up of characters that are hand-written, typed, and/or printed. The physical document may also include non-text objects such as graphics, charts, tables, pictures, and/or other embedded contents.

The document image (102) may be part of a collection of document images that are processed by the system (100) to generate intermediate and final results. Further, the document image (102) may be of any size and in any image format (e.g., BMP, JPEG, TIFF, PNG, etc.). The document image (102) includes one or more foreground objects that correspond to the text, graphics, charts, tables, pictures, and/or other embedded contents of the physical document. All portions of the document image (102) excluding the foreground objects are considered the background of the document image (102). The document image (102) includes certain amounts of image noise, which is a random variation of brightness or color information in the document image (102). The image noise may be produced by an image sensor, circuitry of a document scanner, and/or a digital camera used to generate the document image (102). The image noise present in the background (107) is referred to as background noise.

The buffer (101) is further configured to store the intermediate and final results of the system (100) that are directly or indirectly derived from the document image (102). The intermediate and final results include at least an original mask (103a), an inverse mask (103b), original CCs (connected components) (104a), inverse CCs (104b), combined CCs (105), selected CCs (106), a content mask (107), a final image (111), which are described in more detail below.

The original mask (103a) is a binary mask based on a grayscale equivalent of the document image (102). The binary mask is a derivative of an image where pixels are assigned binary values. Specifically, each pixel in the image corresponds to a binary valued pixel in the binary mask. In the grayscale equivalent, the pixel value of each pixel in the document image (102) is converted to an intensity level of the pixel value. In one example, the intensity level may be in the range of 0-255.

The grayscale equivalent of the document image (102) is referred to as the grayscale image. In the original mask (103a), pixels having pixel values in the grayscale image greater than a threshold value are marked while pixels in the grayscale image having pixel values less than or equal to the threshold value are unmarked. In one example, marked pixels may be assigned with the binary number "1" while unmarked pixels may be assigned with the binary number "0". In one or more embodiments, the threshold value is an adaptive threshold that is calculated individually for each pixel in the grayscale image.

In contrast, the inverse mask (103b) is a binary mask based on an inverse grayscale equivalent of the document image (102). In the inverse grayscale equivalent, the pixel value of each pixel in the grayscale image is converted to a complimentary value of the intensity level. In one example, the complimentary value of the intensity level is 255 minus intensity level.

Additionally, the inverse grayscale equivalent of the document image (102) is referred to as the inverse grayscale image. In the inverse mask (103b), pixels having pixel values in the inverse grayscale image greater than a threshold value are marked while pixels in the inverse grayscale image having pixel values less than or equal to the threshold value are unmarked. In one example, the same marking scheme utilizing binary numbers "1" and "0" may be applied to the marked and unmarked pixels (i.e., marked pixels are assigned the binary number "1" while unmarked pixels are assigned the binary number "0"). In one or more embodiments, the threshold is an adaptive threshold that is calculated individually for each pixel in the inverse grayscale image.

The original CCs (104a) are a collection of connected components of the original mask (103a). Each original CC corresponds to a cluster (i.e., a connected set) of marked pixels within the original mask (103a). Based on the pixel correspondence between the original mask (103a) and the document image (102), each original CC corresponds to a geometrically contiguous region within the document image (102). Similarly, the inverse CCs (104b) are a collection of connected components of the inverse mask (103b). Each inverse CC corresponds to a cluster of marked pixels within the inverse mask (103ab). Based on the pixel correspondence between the inverse mask (103b) and the document image (102), each inverse CC corresponds to a geometrically contiguous region within the document image (102).

The combined CCs (105) are a combination of the original CCs (104a) and the inverse CCs (104b). In the combined CCs (105), one or more connected components may be modified to eliminate any overlap with other connected components. Regardless of being an original CC or inverse CC, each connected component in the combined CCs (105) is assigned a unique identifier. In particular, each connected component in the combined CCs (105) corresponds to a uniquely identified region within the document image (102).

Furthermore, each uniquely identified geometrically contiguous region may relate to a portion of a foreground object or to a portion of the background in the document image (102). The foreground objects are to be protected from degradation that may result from the noise reduction process of one or more embodiments. In other words, the protection areas are areas in the document image (102) that are excluded from the noise reduction process.

The protection areas include common protection areas and selected protection areas. The common protection areas are the protection areas identified based on the uniquely identified geometrically contiguous regions belonging to predetermined foreground objects, such as text, natural images, or other frequently occurring objects. The selected protection areas are the protection areas identified based on the uniquely identified geometrically contiguous regions belonging to the remaining foreground objects in the document image (102) other than the predetermined foreground objects.

The selected CCs (106) is a subset of the combined CCs (105) that correspond to the selected protection areas of the document image (102).

The content mask (107) is a binary mask where marked pixels correspond to the protection areas of the document image (102).

The final image (111) is a version of the document image (102) with pixel values of identified noise pixels converted to a uniform background color. In one or more embodiments, the background color is the dominant pixel value in the document image (102). For example, the dominant pixel value may be determined as the mode of a histogram of pixel values in the document image.

In one or more embodiments of the invention, the CC engine (108) may be implemented in hardware (i.e., circuitry), software, or any combination thereof. The CC engine (108) parses the document image (102) to generate the original mask (103a), inverse mask (103b), original CCs (104a), inverse CCs (104b), combined CCs (105), and selected CCs (106). In one or more embodiments, the CC engine (108) performs the functions described above using the method described below in reference to FIG. 2. Examples of the document image (102) and the original mask (103a), inverse mask (103b), original CCs (104a), inverse CCs (104b), combined CCs (105), and selected CCs (106) are shown in FIGS. 3A-3K below.

In one or more embodiments of the invention, the content mask engine (109) may be implemented in hardware (i.e., circuitry), software, or any combination thereof. The content mask engine (109) generates the content mask (107) based on one or more of the original mask (103a), inverse mask (103b), original CCs (104a), inverse CCs (104b), combined CCs (105), and selected CCs (106). In one or more embodiments, the content mask engine (109) performs the functions described above using the method described below in reference to FIG. 2. Examples of the content mask (107) are shown in FIGS. 3L-3N below.

In one or more embodiments, the noise reduction engine (110) may be implemented in hardware (i.e., circuitry), software, or any combination thereof. The noise reduction engine (110) generates the final image (111) based on the content mask (107). In one or more embodiments, the noise reduction engine (110) performs the functions described above using the method described below in reference to FIG. 2. Examples of reducing noise and the final image (111) are shown in FIGS. 3O-3R below.

Although the system (100) is shown as having four components (101, 108, 109, 110), in one or more embodiments of the invention, the system (100) may have more or fewer components. Furthermore, the functions of each component described above may be split across components. Further still, each component (101, 108, 109, 110) may be utilized multiple times to carry out an iterative operation.

Figure 2:
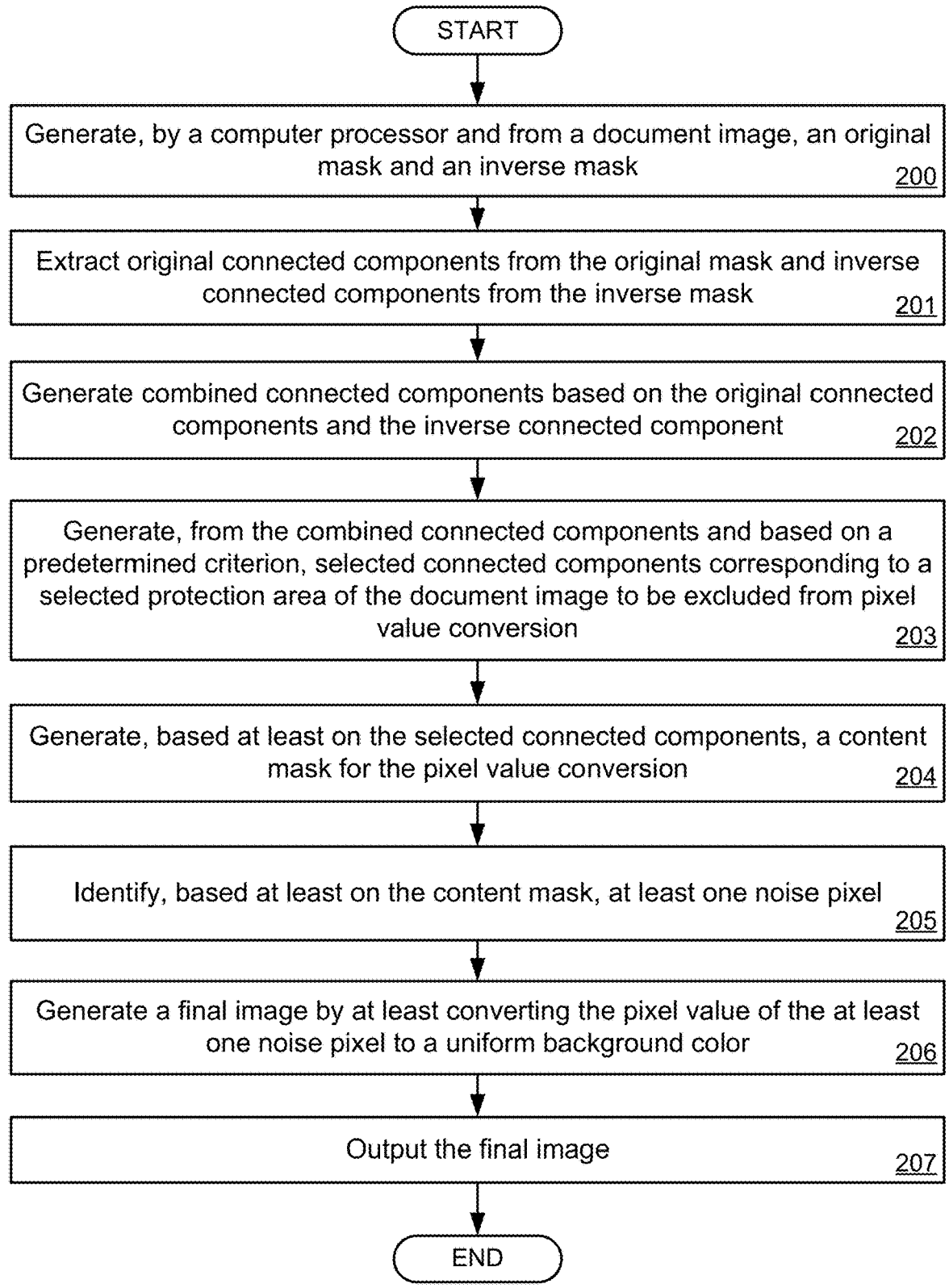
FIG. 2 shows a flowchart in accordance with one or more embodiments of the invention.

FIG. 2 shows a flowchart in accordance with one or more embodiments of the invention. One or more of the steps in FIG. 2 may be performed by the components of the system (100), discussed above in reference to FIG. 1. In one or more embodiments, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Referring to FIG. 2, initially in Step 200, according to one or more embodiments, an original mask and an inverse mask are generated from a document image. The document image is first converted to a grayscale image and an inverse grayscale image. The original mask is generated by applying a thresholding operation to the grayscale image. The inverse mask is generated by applying the thresholding operation to the inverse grayscale image. The thresholding operation assigns a label to each pixel in the document image based on a comparison between the pixel value and a threshold value. As discussed in the examples above, pixels having pixel values greater than the threshold value are marked and assigned the binary value label "1" while pixels having pixel values less than or equal to the threshold value are unmarked and assigned the binary value label "0".

In one or more embodiments, the threshold is determined individually for each pixel in the grayscale image and for each pixel in the inverse grayscale image using an adaptive thresholding algorithm. The matrix of pixels with assigned labels for the grayscale image is designated as the original mask. The matrix of pixels with assigned labels for the inverse grayscale image is designated as the inverse mask. An example of generating the original mask and the inverse mask using the adaptive thresholding algorithm is described in reference to FIGS. 3A-3C below.

In Step 201, one or more original connected components are extracted from the original mask. In the original mask, adjacent marked pixels are collected into a cluster of marked pixels. Each cluster of marked pixels is a single original connected component. The collection process iterates until each pixel in the original mask either belongs to a specific original connected component or is an isolated pixel without any adjacent pixels. Each isolated pixel is designated as a single pixel original connected component. An example of extracting the original connected components is described in reference to FIG. 3D below.

Further in Step 202, one or more inverse connected components are extracted from the inverse mask. In the inverse mask, adjacent marked pixels are collected into a cluster of marked pixels. Each cluster of marked pixels is a single inverse connected component. The collection process iterates until each pixel in the inverse mask either belongs to a specific inverse connected component or is an isolated pixel without any adjacent pixels. Each isolated pixel is designated as a single pixel inverse connected component. An example of extracting the inverse connected components is described in reference to FIG. 3E below.

In Step 202, a collection of combined connected components is generated by combining the original connected components and the inverse connected components. Each connected component is assigned a unique identifier in the combined connected components. For example, the unique identifiers may be a sequence of numerical identifiers individually assigned to each original connected component and each inverse connected component. The connected components are modified to eliminate any overlap between multiple connected components. For example, each inverse connected component may be trimmed before being collected into the combined connected components to remove any pixel found in adjacent original connected components. A connected component having horizontal and vertical dimensions matching the corresponding dimensions of the document image within a predetermined measure of difference (e.g., a 1% difference in both dimensions), if exists, is identified as a background connected component. Any identified background connected components are excluded from the collection of combined connected components. An example of generating the combined connected components is described in reference to FIG. 3F below.

In Step 203, a collection of selected connected components is generated, based on a predetermined criterion, from the combined connected components. Initially, the document image is analyzed to identify common connected components, which are connected components relating to predetermined types of foreground objects. In particular, the common connected components correspond to common protection areas of the document image. For example, the common connected components may include text connected components and natural image connected components. For example, any connected component that overlaps a text bounding box by more than a predetermined percentage (e.g., a predetermined percentage of 80%) of all pixels in the connected component is identified as a text connected component. Similarly, any connected component that overlaps a natural image bounding box by more than a predetermined percentage (e.g., a predetermined percentage of 80%) of all pixels in the connected component is identified as a natural image connected component.

In one or more embodiments, a non-background mask is generated where a pixel is marked if the pixel value of a corresponding pixel in the document image is different than the background color. In addition to the background connected component removed from the combined connected components in Step 203, a connected component is identified as a remaining background connected component if unmarked pixels in the non-background mask overlaps more than a predetermined percentage (e.g., a predetermined percentage of 80%) of all pixels in the connected component.

Once identified, the common connected components and the remaining background connected components are excluded from the combined connected components. Subsequent to excluding the common connected components and the background connected components, any remaining connected component that has dimensions (or other predetermined size measure) less than a predetermined threshold (e.g., a predetermined threshold of 5 pixels) is identified as a small connected component. In one or more embodiments, all common connected components, all small connected components, and all background connected components are excluded from the collection of combined connected components where the remaining subset is designated as the selected connected components.

More specifically, excluding the small connected components effectively leaves out corresponding pixels in the document image from the selected protection areas as well as the common protection areas. In other words, the pixels corresponding to the small connected components are not protected from subsequent noise reduction process. In this context, excluding the small connected components effectively performs a first level noise reduction, referred to as a cautious noise reduction. An example of generating the selected connected components is described in reference to FIGS. 3G-3K below.

In a scenario where a document image includes dark content over light background, the selected components may include one or more inverse connected components having pixels that correspond to particular selected protection areas of the document image. For an example where the text connected components and the natural image connected components are not included in the selected connected components, the particular selected protection areas may correspond to filled or stroked vector graphics content or gridlines in a data table. For example, FIG. 3K below shows the table gridlines included in the selected protection area.

In a scenario where a document image includes light content over dark background, the selected components may include one or more original connected components having pixels that correspond to particular selected protection areas of the document image. For an example where the text connected components and the natural image connected components are not included in the selected connected components, the particular selected protection areas may correspond to filled or stroked vector graphics content or gridlines in a data table. For example, FIG. 4B below shows the edge of a skull drawn as vector graphics included in the selected protection area.

In Step 204, a content mask for the pixel value conversion is generated based at least on the selected connected components. Initially, the content mask is initialized as a matrix of unmarked pixels where the matrix matches the number of pixels in horizontal and vertical dimensions of the document image. Once initialized, pixels that correspond to the common connected components are marked in the content mask. In addition to marking the pixels corresponding exactly to the common connected components, additional related pixels are also marked. For example, pixels in the entire bounding box surrounding a given CC are marked along with the pixels corresponding to the CC. In the case of text CCs, the bounding boxes are scaled up by certain factor (e.g., 1.5) and pixels in the scaled bounding box surrounding a given text CC are marked along with the pixels corresponding to the text CC. The purpose of marking entire (and scaled up) bounding boxes is to ensure that the content is well protected from subsequent morphological operations. Further, pixels that correspond to the selected connected components are also marked in the content mask. The content mask at this stage is designated as the initial content mask. Note that pixels that correspond to the small connected components will remain unmarked in the initial content mask.

Within the initial content mask, a target connected component is identified that has a first dimension (e.g., horizontal dimension) less than a predetermined dilation dimension (e.g., 3 pixels) and a second dimension (e.g., vertical dimension) exceeding the predetermined dilation dimension. Accordingly, a morphological dilation operation is performed on the initial content mask to dilate the target connected component. In particular, only the pixels of each target connect component are dilated. The content mask as a whole is not dilated. In this context, the morphological dilation operation is a selective dilation. The content mask at this stage is designated as the dilated content mask.

An example of generating the content mask is described in reference to FIGS. 3L-3P below.

In Step 205, based at least on the content mask, at least one noise pixel is identified. There are many methods to identify noise pixels and the invention is not limited to any particular method. For example, the noise pixels may be identified by applying a morphological open operation on the dilated content mask where pixels unmarked by the morphological open operation are identified as the noise pixels.

In Step 206, a final image is generated by at least converting the pixel value of the at least one noise pixel is to a uniform background color. Specifically, the final image is generated by converting all noise pixels to the uniform background color.

In Step 207, the final image is outputted. For example, the final image may be displayed on a display device for viewing by a user.

FIGS. 3A-3R and 4A-4B show implementation examples in accordance with one or more embodiments of the invention. The implementation examples shown in FIGS. 3A-3R and 4A-4B are based on the system (100) and method flowchart described in reference to FIGS. 1 and 2 above. In one or more embodiments of the invention, one or more elements shown in FIGS. 3A-3R and 4A-4B may be omitted, repeated, and/or organized in a different arrangement.

Accordingly, the scope of the invention should not be considered limited to the specific arrangement of elements shown in FIGS. 3A-3R and 4A-4B.

In the example shown in FIGS. 3A-3R and 4A-4B below, the document image is the image of a single page document. Removing noise from the background of the document image improves quality (e.g., legibility) of the document image and, as a result, quality of the printed or displayed outputs generated from the document image. As described above, the background noise corresponds to pixel values which differ from the dominant pixel value of the image background. Background noise is reduced by setting pixels that are determined as "noise" to the dominant pixel value of the image background, which results in a uniform background color.

A first task to remove background noise is to identify the background itself (i.e., to distinguish the (possibly noisy) background from non-background content). This can be especially challenging when dealing with images of document pages, such as scans of Microsoft Office documents or of PDFs, because of the variety of content which may be present within the document pages. For example, a document page may contain text of varying sizes, font styles, and colors, shapes with a variety of fills, tables, and natural images (i.e., photographs of real-world scenes). This wide diversity of content types manifests as a wide diversity of visual features, effectively producing a very complex description of content.

Distinguishing background noise from natural images is especially difficult due to the irregular pixel patterns (resembling noise) contained within natural images. Improperly applying noise reduction techniques to a document image containing natural images may degrade the natural image content. One or more embodiments of this invention improves upon these points.

Figure 3A:
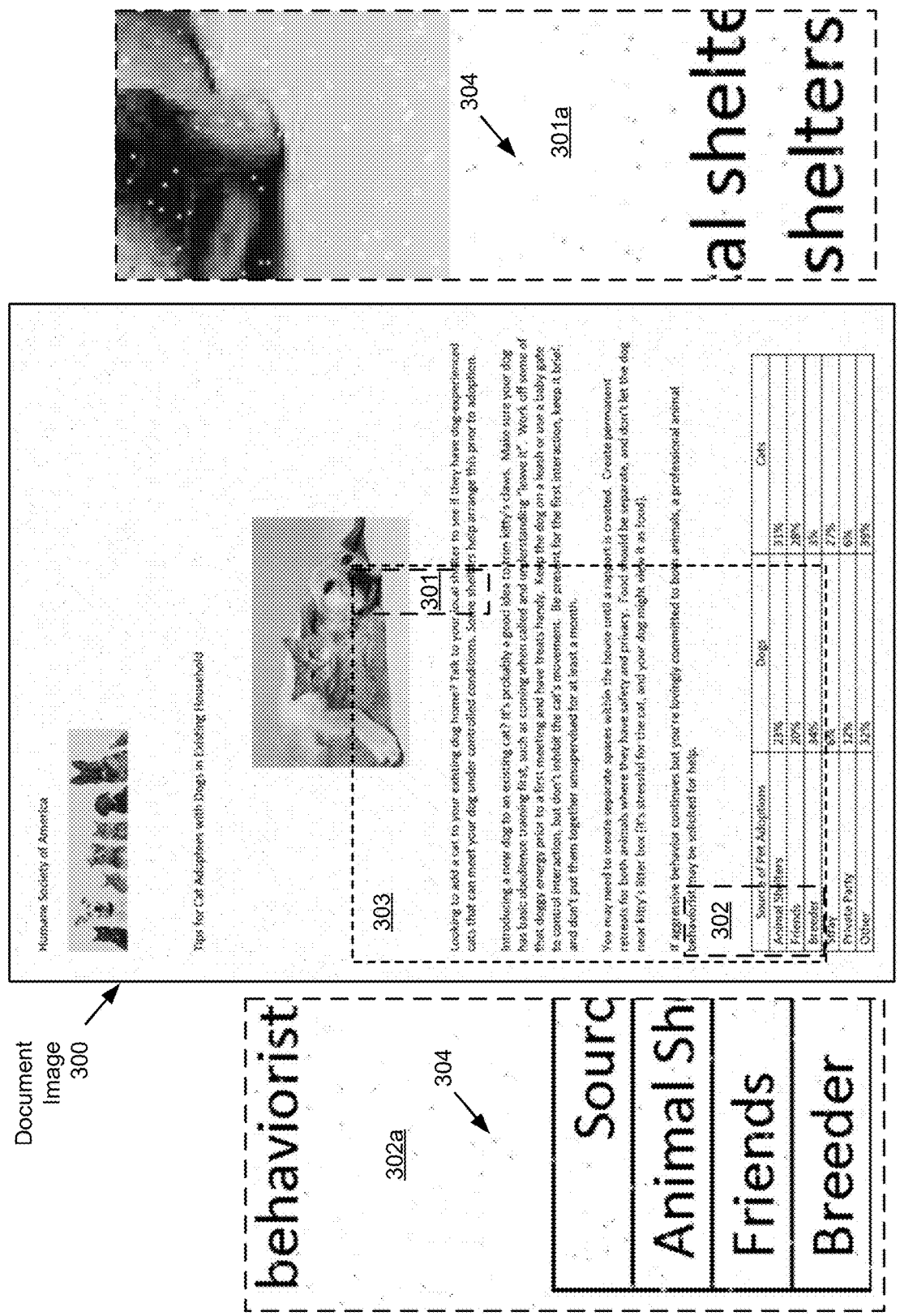
FIGS. 3A-3R show an implementation example in accordance with one or more embodiments of the invention.

FIG. 3A shows an example of the document image (102) in FIG. 1 above. In particular, the document image (300) is an example of the document image (102) that is converted into a grayscale image. For example, pixels in the document image (300) have pixel values ranging from 0-255 where 0 corresponds to a black pixel and 255 corresponds to a white pixel. In this context, a pixel value closer to 0 than 255 is referred to as a dark color, and pixel value closer to 255 than 0 is referred to as a light color. Throughout the description below, the term "mark" means assigning a metadata (i.e., tag) to a pixel to indicate the marked status of the pixel in a mask. While the pixel values shown in FIG. 3A define the content of the document image (300), white pixels shown in various masks described in reference to FIGS. 3B-3R and 4A-4B below correspond to the marked pixels.

As also shown in FIG. 3A, a portion (301) of the document image (300) containing part of a natural image (i.e., a photo of a cat and a dog) is magnified as the enlarged portion (301a) to visibly show the background noises. Similarly, a portion (302) of the document image (300) containing part of a table is magnified as the enlarged portion (302a) to highlight and show the background noises. The background noises are represented as dots (304). A third portion (303) of the document image (300) is also identified for reference in describing FIGS. 3B-3C below.

As noted above, adaptive thresholding, as opposed to thresholding using a single threshold (e.g., Otsu's method), is used to convert the document image (300) into an original mask and an inverse mask. In particular, the adaptive thresholding calculates the threshold individually for each pixel, whereas the Otsu's method calculates a single threshold for the entire image. Using a single threshold for the entire image may result in either too much noise or too little content being retained after noise reduction.

An example adaptive thresholding operation is based on the formula Eq. (1) below.

$$dst(x, y) = \begin{cases} \text{maxValue} & \text{if } src(x, y) > T(x, y) \\ 0 & \text{otherwise} \end{cases} \quad \text{Eq. (1)}$$

In Eq. (1), src(x,y) denotes the pixel value of a pixel at coordinate (x,y) in the document image (300). In addition, T(x,y) denotes the threshold value that is calculated for the pixel at coordinate (x,y) based on the values of neighboring pixels surrounding the coordinate (x,y). For example, T(x,y) may be calculated as a mathematical average of pixels values of all four surrounding pixels minus a constant C. Correspondingly, dst(x,y) denotes the value assigned to the pixel at coordinate (x,y) in the original or inverse mask. By individually applying Eq. (1) across all pixels in the document image (300), dst(x,y)=maxValue indicates that the pixel at (x,y) is a marked pixel, while dst(x,y)=0 indicates that the pixel at (x,y) is an unmarked pixel.

When producing the original mask of a document image having dark content over a light background, a small positive value for C (e.g., 2 in comparison to 255) is used. The relatively small value for C tends to mark filled areas, which are areas filled with approximately uniform (or gradually changing) color, regardless of whether the filled color values are light or dark. Filled areas are marked for all types of content, including vector graphics, text characters, and portions of images.

When producing the inverse mask of a document image having dark content over a light background, C is set to zero (i.e., C=0). Setting C=0 in combination with the fact that the image pixels are inverted with respect to the original grayscale image tends to mark the inverse of what are marked in the original mask. The inverse mask tends to mark edges (i.e., areas at the boundaries of significant color changes) of all types of content, such as strokes of text or vector graphics, and gridlines in a table.

As discussed above, for a document image having dark content over a light background, the original mask tends to mark the filled areas, and the inverse mask tends to mark the edges. For example, the inverse mask tends to mark the strokes in text, gridlines of table, or other edges in the dark content. The original mask tends to mark the filled areas surrounding the edges in the dark content.

Figure 3B:
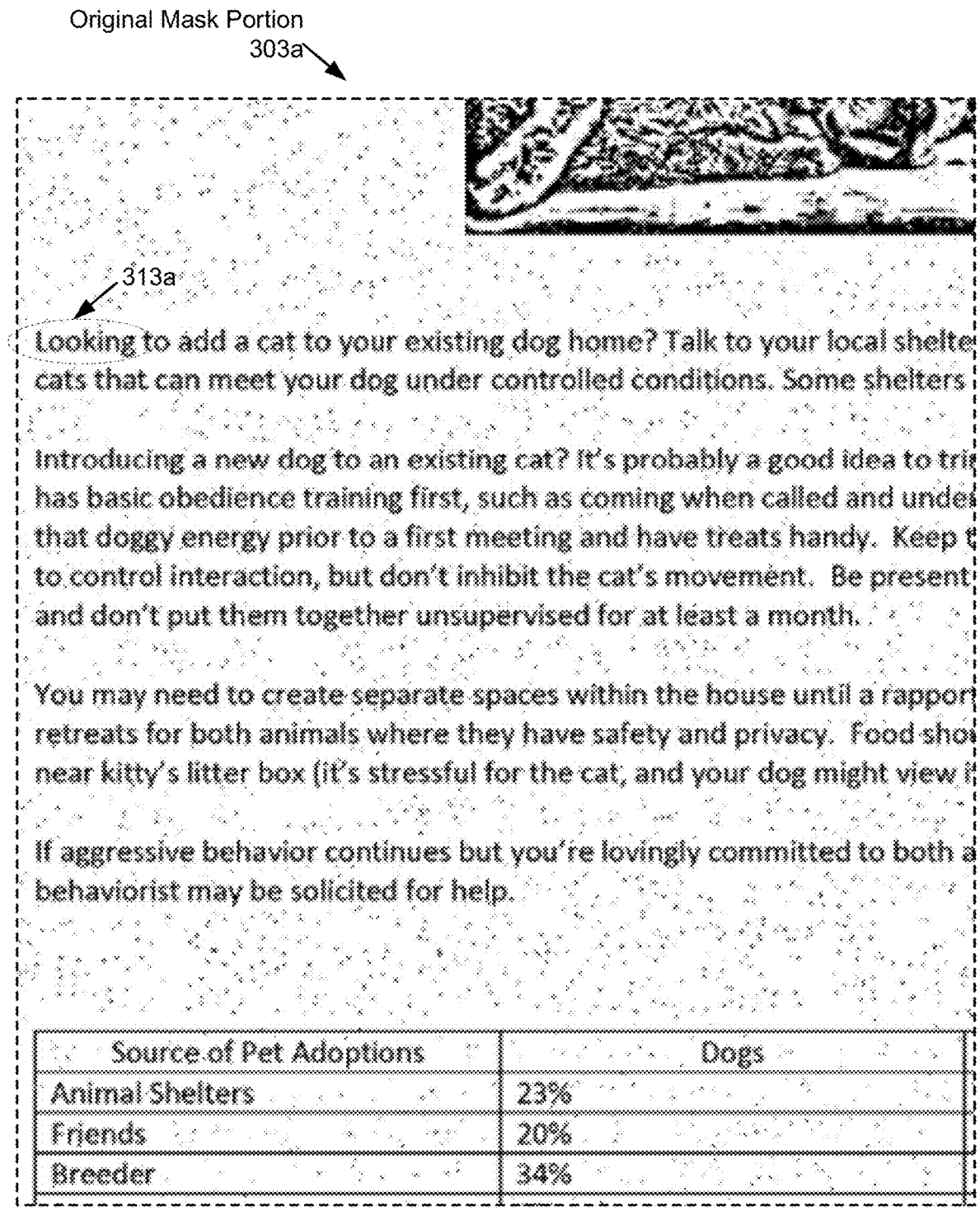

FIG. 3B shows an original mask portion (303a), which is an example of a portion of the original mask (103a) discussed above in reference to FIG. 1. Only a portion of the original mask (103a) is shown in the example here so that the noises are more visible. In particular, an adaptive thresholding operation is applied to convert the document image (300) into a corresponding original mask where the portion (303) is converted into the original mask portion (303a). In the original mask portion (303a), the region (313a) includes black pixels, representing unmarked pixels, forming the word "Looking." In other words, the filled area surrounding the word "Looking" is marked, or set to white in the original mask portion (303a). Similarly, the filled areas enclosed by gridlines of the table are also marked white in the original mask portion (303a).

Figure 3C:
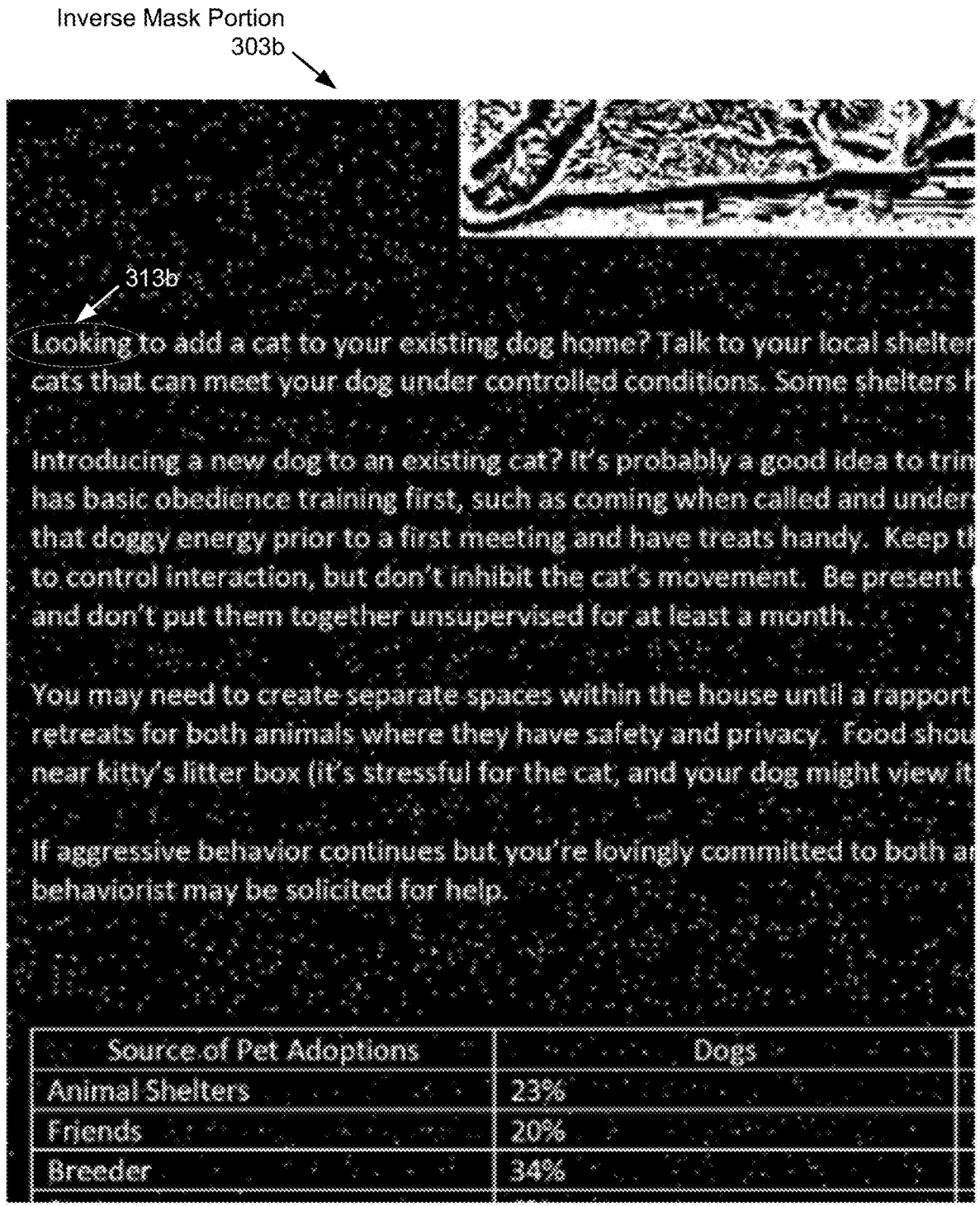

FIG. 3C shows an inverse mask portion (303b), which is an example of a portion of the inverse mask (103b) discussed above in reference to FIG. 1. Only a portion of the inverse mask (103b) is shown in the example here so that the noises are more visible. In particular, an adaptive thresholding operation is applied to convert an inversion of the document image (300) into a corresponding inverse mask where the portion (303) is converted into the inverse mask portion (303b). In the inverse mask portion (303b), the region (313b) includes white pixels (i.e., with pixel value 255) forming the word "Looking." In other words, the edges (i.e., strokes in the text) forming the word "Looking" are marked white (i.e., marked and shown as white) in the inverse mask portion (303b). Similarly, the gridlines (i.e., edges) of the table are also marked white in the inverse mask portion (303b).

In the following steps, marked pixels are clustered into connected components (CCs) as higher-level representations of content and background. Based on the document image (300), white (i.e., marked) pixels in the original mask are clustered to generate a list of original CCs. Similarly, white (i.e., marked) pixels in the inverse mask are clustered to generate a list of inverse CCs. Based on the dark text on light background in the document image (300), the original CCs generally correspond to filled areas, such as enclosed areas within a text character, gridlines of a table, etc., while the inverse CCs generally correspond to edges, such as strokes of a text character, gridlines of a table, etc.

For each list of CCs, there is a corresponding "label" image, having the same dimensions and number of pixels as the document image. An unique identifier of each CC is assigned to a corresponding pixel as the pixel value in the label image. Zero is assigned as the pixel value for any pixel that is not associated with a CC. Each pixel with a non-zero pixel value in the label image is associated with a label (identifier) of the connected component (CC) to which that pixel belongs. The label of each CC is assigned by the algorithm that generates the list of CCs and is unique among all original CCs or unique among all inverse CCs. For example, the labels (identifiers) may be a set of sequential numbers.

For a typical document image, having a constant color filled (usually white) background, a page background CC may be detected in the list of original CCs as the one with similar dimension(s) to the document image. In less typical cases, such as a document image having natural images as the background, a page background CC may not be detected. The page background is not considered content and the corresponding background CC, if detected, is removed from the list of CCs.

Figure 3D:
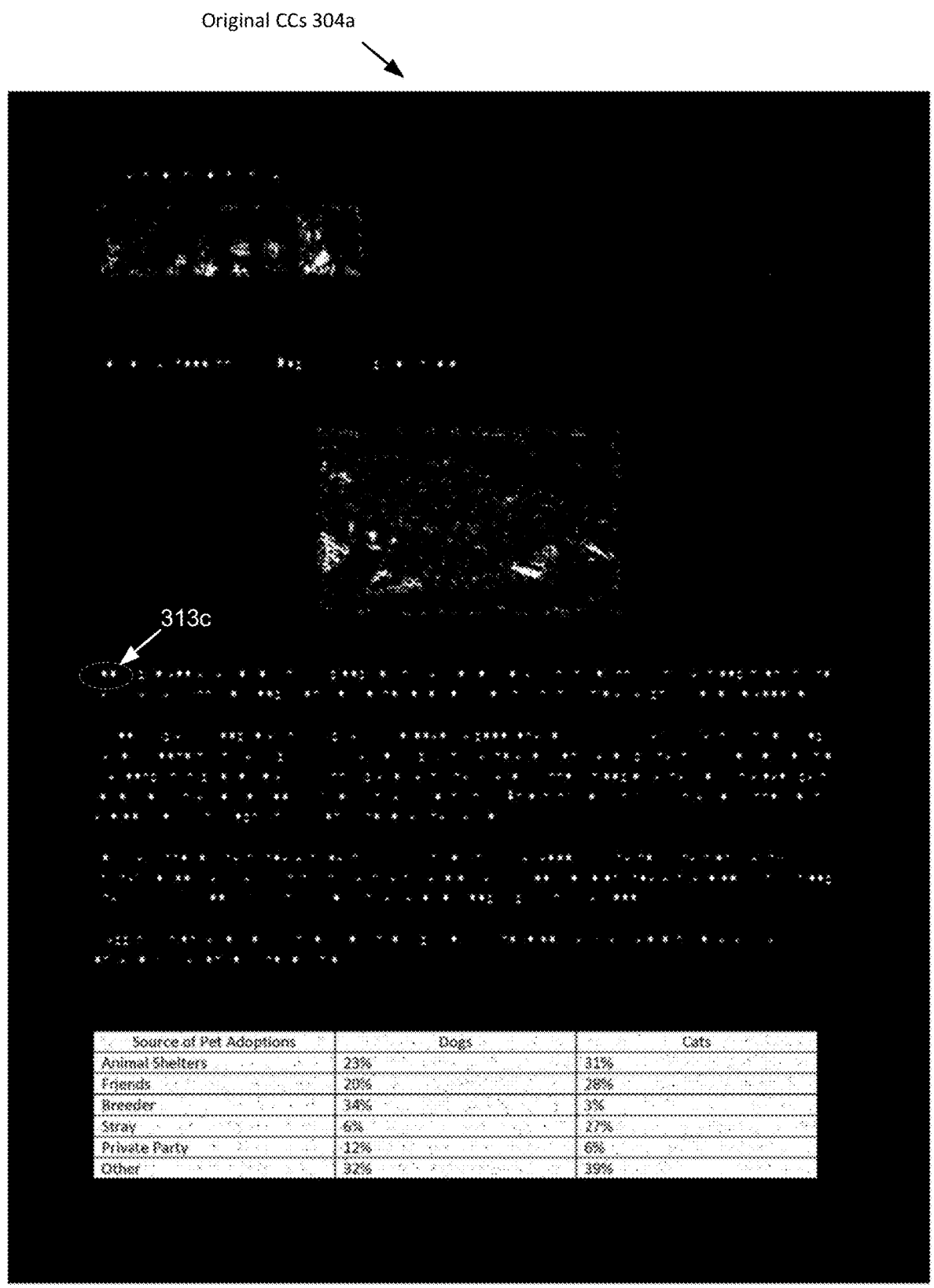

FIG. 3D shows an original CCs (304a), which is an example of the original CCs (104a) discussed above in reference to FIG. 1. In particular, the original CCs (304a) shows a graphic representation (i.e., based on the label image) of all CCs (excluding the removed background CC) extracted from the original mask of the document image (300). Specifically, each cluster of white pixels in the original CCs (304a) represents one CC. In the original CCs (304a), the region (313c) includes two white circular shaped pixel clusters (i.e., two original CCs) that correspond to the two separate enclosed areas of the two letters "oo" in the word "Looking." Similarly, the white filled areas enclosed by gridlines of the table correspond to one or more original CCs. There are approximately 1376 original CCs in the original CCs (304a). The labels of each CC are not explicitly shown in FIG. 3D.

Figure 3E:
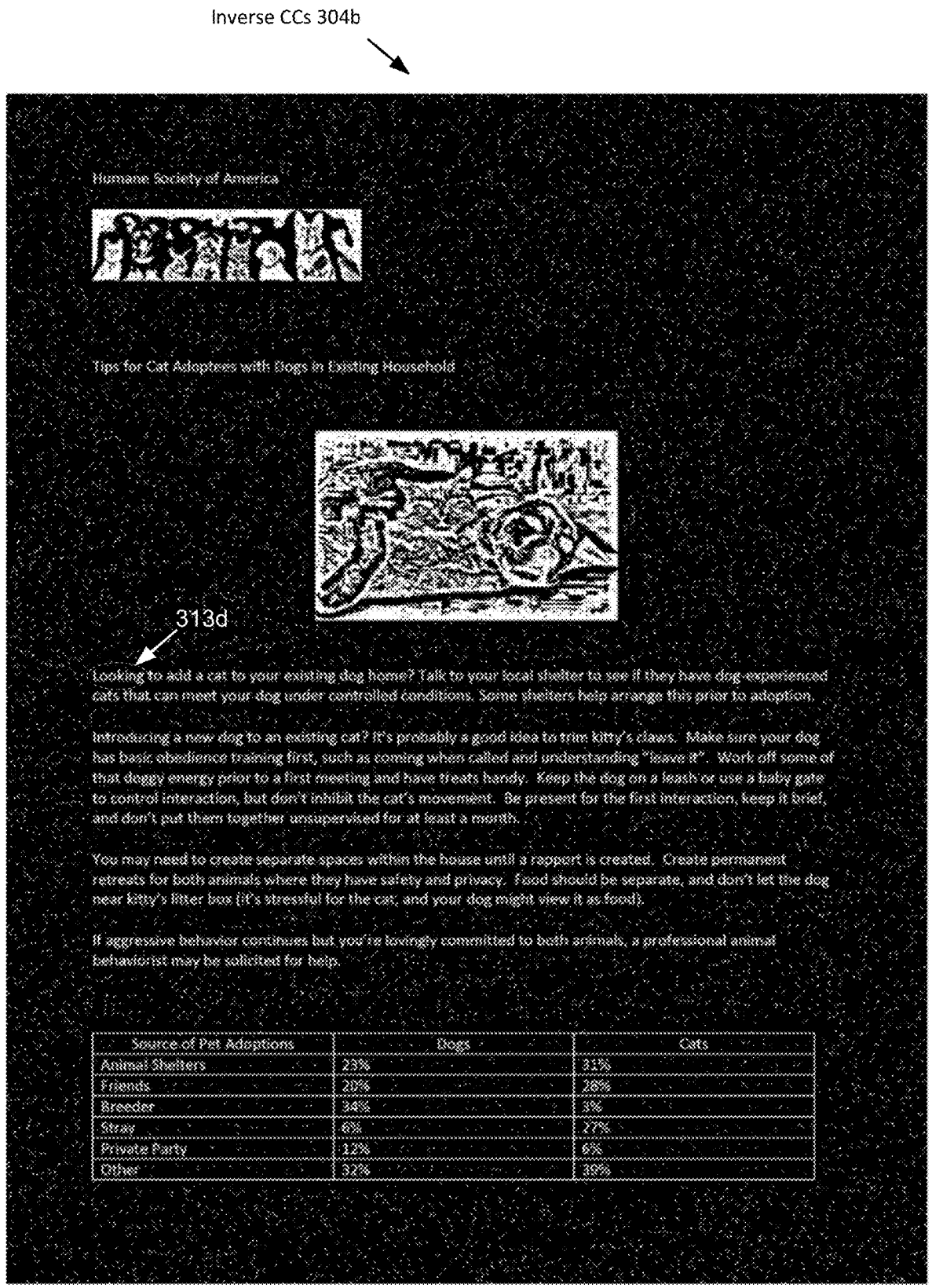

FIG. 3E shows an inverse CCs (304b), which is an example of the inverse CCs (104b) discussed above in reference to FIG. 1. In particular, the inverse CCs (304b) shows a graphic representation (i.e., based on the label image) of all CCs extracted from the inverse mask (303b). Specifically, each cluster of white pixels in the inverse CCs (304b) represents one CC. In the inverse CCs (304b), the region (313d) includes white pixels forming the word "Looking," where each letter of the word corresponds to one inverse CC. Similarly, the white gridlines of the table correspond to a single inverse CC. There are approximately 14320 inverse CCs in the inverse CCs (304b). The labels of each CC are not explicitly shown in FIG. 3E.

The original CCs (304a) and inverse CCs (304b) are combined to generate the combined CCs (305) as described in step (1) and step (2) below.

(1) Initialize the combined CCs to consist of copies of all the original CCs. The initialized combined CCs may consist of only copies of all the original CCs.

(2) Merge the inverse CCs into the combined CCs, leaving the copies of the original CCs unmodified. The following steps are performed to offset the sequential labels (i.e., identifiers) of the inverse CCs. Accordingly, the label of each CC is unique among all original CCs and inverse CCs in the combined CCs (305).

(i) Identify the number of original CCs as num_orig_ccs.

(ii) Offset the labels of the inverse CCs by num_orig_ccs. That is, increment the label of each inverse CC by adding num_orig_ccs.

(iii) For each of the inverse CCs being merged into the combined CCs, modify its copy at the pixel level of granularity such that the copy does not overlap any CCs already present in the combined CCs. Modifying each copy means removing any intersecting areas between the copy and already-present CCs. Because the combined CCs initially includes the original CCs copies, the original CCs copies are not modified as a result of merging the inverse CCs into the combined CCs.

Note that since the copies of the inverse CCs may have modified geometry, a modified copy of an inverse CC may include a set of disjoint pixels, rather than a set of connected pixels. In addition, some inverse CC may entirely overlap one or more original CCs and not be copied over into the combined CCs.

In contrast to combining the original mask and the inverse masks, and then generating new CCs from the combined masks, generating the combined CCs as described above distinguishes the original CCs from the inverse CCs and keeps the two CCs distinct from one another. For example, the CCs representing interior filled areas of tables or vector graphics and CCs representing exterior edges of tables or vector graphics remain distinct from one another in the combined CCs. Accordingly, noises in the interior filled areas may be removed without impacting the exterior edges.

Figure 3F:
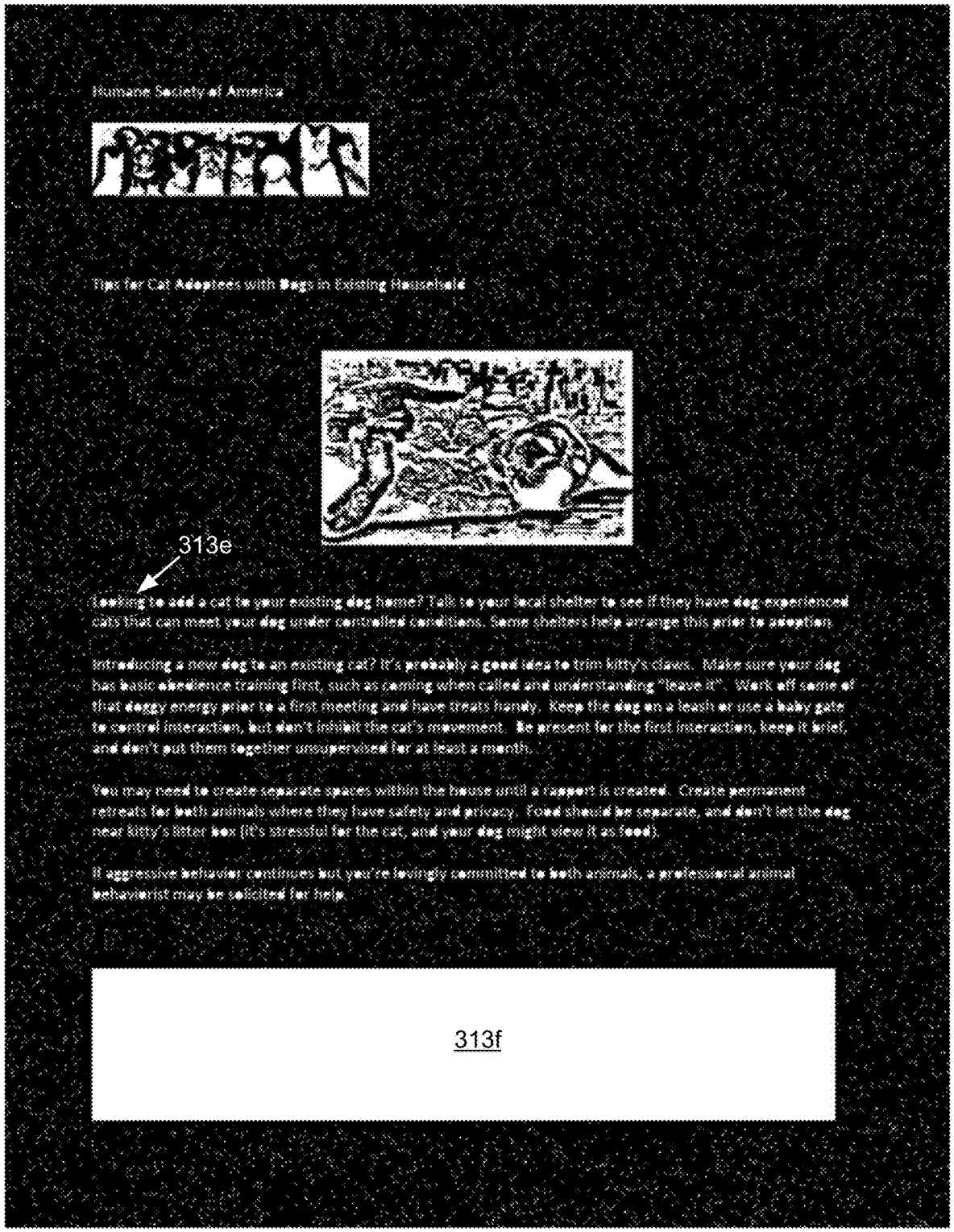

FIG. 3F shows a combined CCs (305), which is an example of the combined CCs (105) discussed above in reference to FIG. 1. In particular, the combined CCs (305) shows a graphic representation (i.e., based on the label image) of a combined list of original CCs and inverse CCs. A cluster of white pixels in an original CC and another cluster of white pixels in an adjacent inverse CC may be visibly indistinguishable from each other in the combined CCs (305), however, the two clusters of while pixels are assigned distinct labels (i.e., identifiers) that are not explicitly shown in FIG. 3F. In the combined CCs (305), the region (313e) includes white pixels that are visually combined from the white pixels in the region (313c) and the white pixels in the region (313d) discussed above in reference to FIGS. 3D and 3E. Note that the white pixels in the region (313c) and the white pixels in the region (313d) are assigned distinct labels. In addition, the region (313f) includes white pixels that are visually combined from the white pixels in the table discussed above in reference to FIGS. 3D and 3E. Note that the white pixels in the region (313f), although visually combined into a single rectangle, are assigned distinct labels according to distinct original CCs and inverse CCs associated with the table. For example, the original CCs corresponding to the white filled areas of the table and the inverse CC corresponding to the gridlines of the table are assigned distinct labels.

Figure 3G:
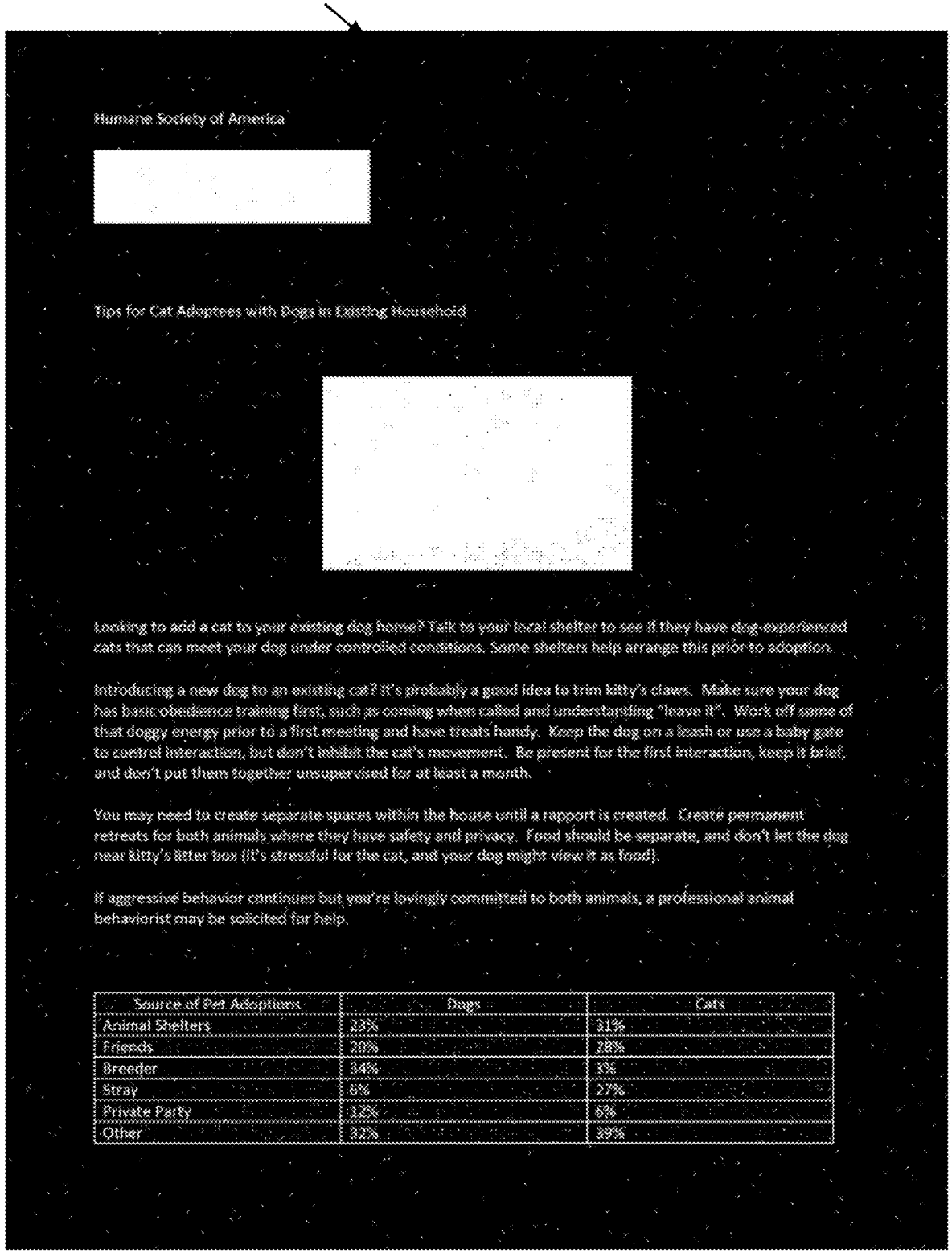

FIG. 3G shows a non-background mask (315) for removing any remaining CCs, from the selected CCs A (306a), that relate to the background of the document image (300). As shown in FIG. 3G, marked pixels are deemed as not belonging to the pixels that make up the background of the document image (300). For example, the text strokes, the natural images excluding certain dots, and the gridlines of the table are marked white in the non-background mask (315). Although any page background CC, if detected, are already removed from the original CCs (304a) and therefore is not included in the combined CCs (305) or the selected CCs A (306a), the detected background CC does not include all CCs that relate to the background, such as filled areas enclosed within gridlines of the table. The non-background mask (315) is generated by unmarking any pixel in the document image (300) with a pixel value that corresponds to the background color. The background color is the dominant pixel value in the document image (300). For example, the mode (i.e., peak value) of a histogram of all pixel values in the document image (300) may be used as the background color. In a scenario where the document image (300) is converted from an original color image, the background color is set based on the histogram of all pixel values in the original color image. Accordingly, the non-background mask (315) is generated by unmarking any pixel in the original color document with pixel value that corresponds to the background color.

Based on the method described above, a marked pixel in the non-background mask (315) indicates that the corresponding pixel in the document image (300) does not belong to the background.

FIGS. 3H-3K show an example to identify CCs that represent selected protection areas that are not part of text or natural images.

Figure 3H:
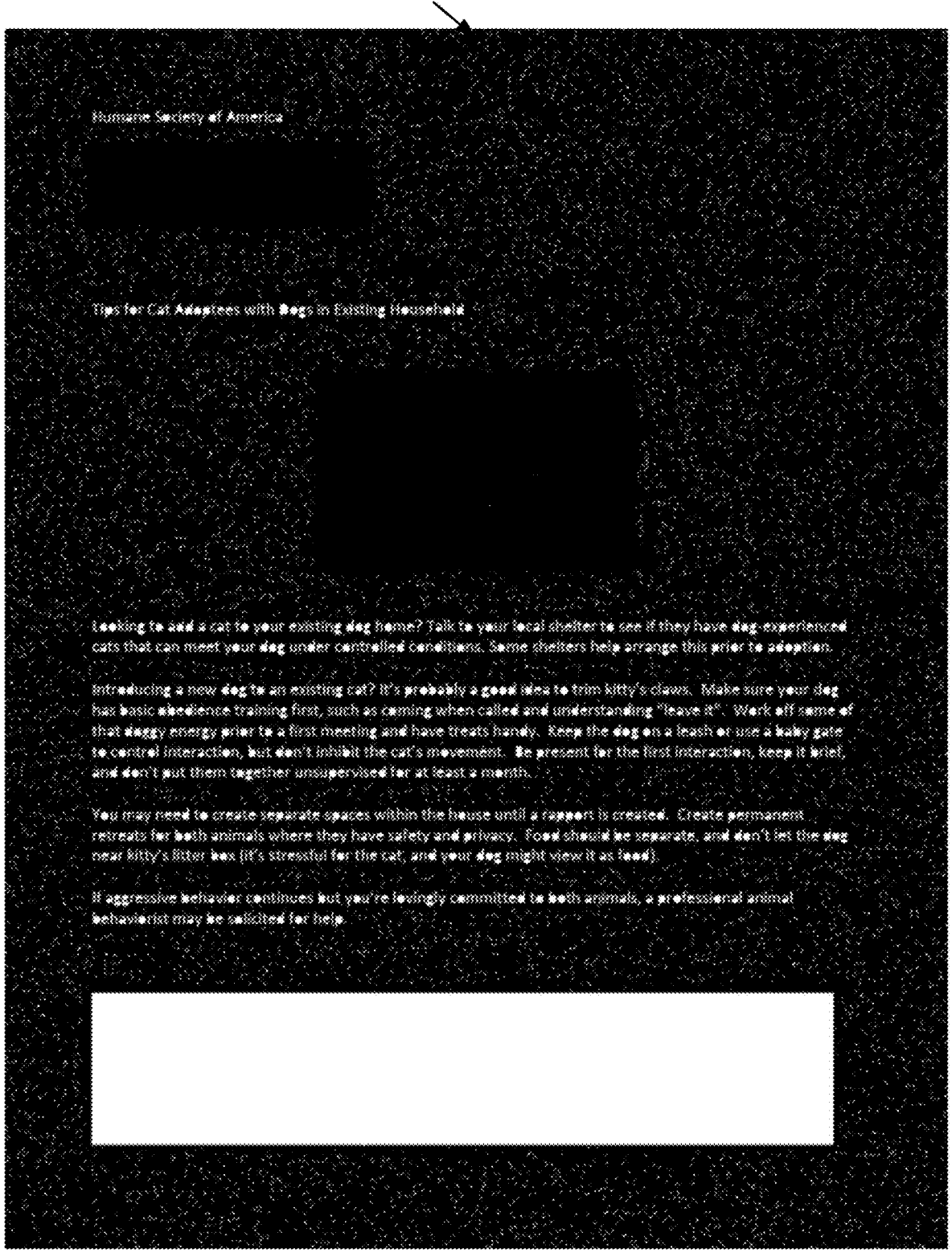

FIG. 3H shows a selected CCs A (306a), which is an example of the selected CCs (106) discussed above in reference to FIG. 1. In particular, the selected CCs A (306a) corresponds to the combined CCs (305) excluding any CCs representing natural images.

There are various methods to identify natural images and corresponding bounding boxes from the document image (300). The invention is not limited to using any particular method to identify natural images. In some of these methods, the non-background mask (315) is used to facilitate identifying natural images from the document image (300). For example, a given CC may be categorized as a portion of a natural image by considering the fill density, which corresponds to the percent of pixels within the bounding box of the CC that are marked by the CC. The higher the percent, the higher the fill density. In an example method, natural images correspond to CCs having a fill density above a certain threshold, such as 60%. Further, the non-background mask may be used to identify the percent of pixels within the bounding box of the CC which are of the background color. The higher the percent of pixels which are of the background color, the more likely that the CC is a piece of background.

Once all natural images are identified from the document image (300), all CCs that are fully contained within the areas (e.g., defined by the bounding boxes) of the natural images are removed from the combined CCs (305) to generate the selected CCs A (306a). In particular, the removed CCs correspond to parts of the natural images, or in some cases correspond to bits of noise within the images. In either case, the removed CCs are excluded from, or otherwise prevented from affecting, subsequent noise reduction such that the natural images are protected against any damage from the noise reduction. This is because the CCs representing parts of natural images are often irregular and of small granularity, similar to noise, and therefore prone to destruction by noise reduction techniques.

Figure 3I:
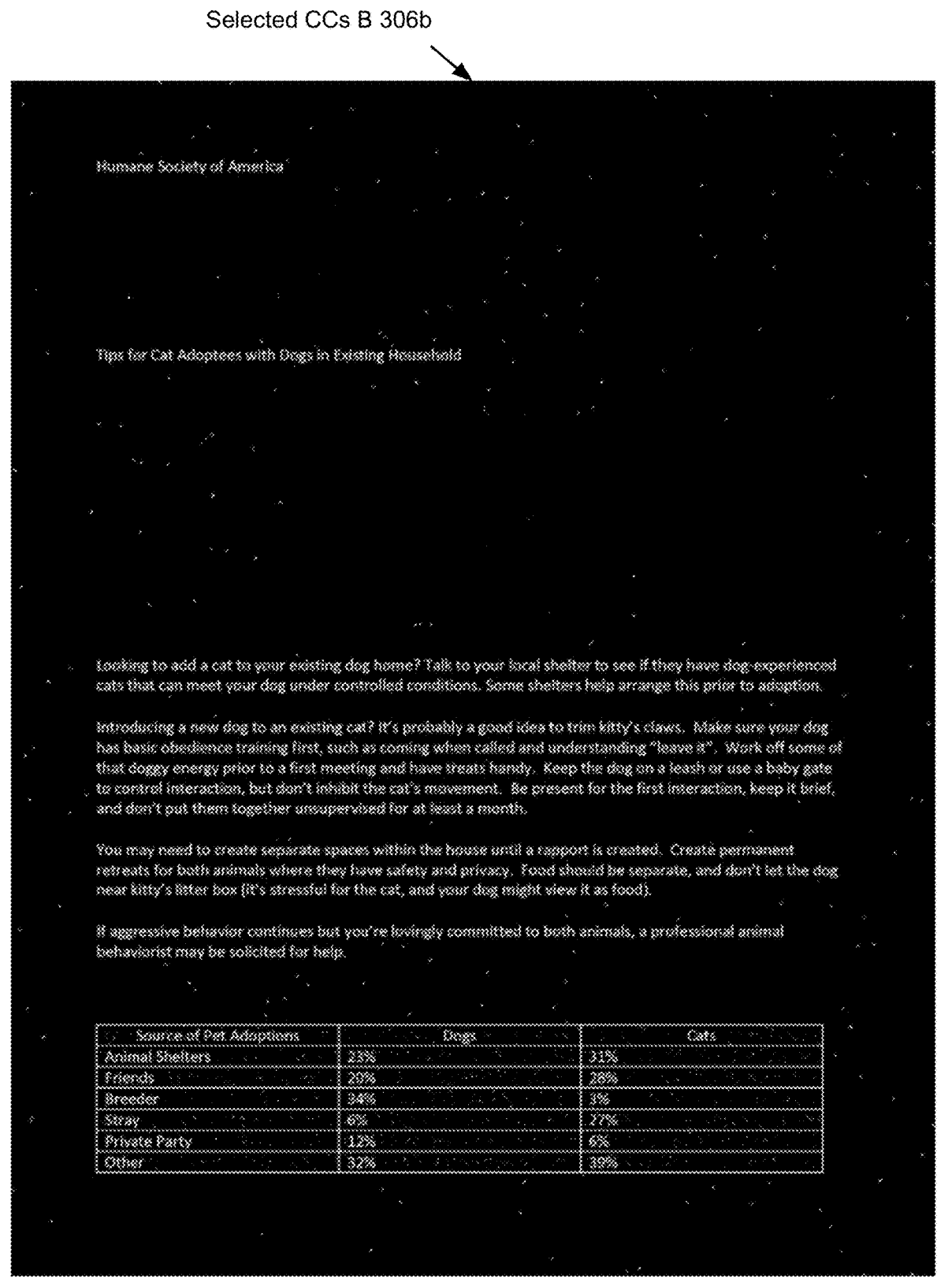

FIG. 3I shows a selected CCs B (306b), which is a further example of the selected CCs (106) discussed above in reference to FIG. 1. In particular, the selected CCs B (306b) corresponds to the selected CCs A (306a) excluding any CCs representing remaining background. In other words, the selected CCs B (306b) corresponds to the combined CCs (305) excluding any CCs that represent natural images or remaining background. In particular, the CCs representing remaining background are referred to as page background CCs and are identified based on the percent of pixels in the CC that correspond to the background color. As noted above, a marked pixel in the non-background mask (315) indicates that the corresponding pixel in the document image (300) does not belong to the background. Accordingly, one method to identify a CC as a page background CC is by determining a percentage of the pixels of the CC that are unmarked in the non-background mask (315). For example, pixels of the CC that are unmarked in the non-background mask (315) may be identified and tallied by performing a logic AND operation of the CC and an inversed version of the non-background mask (315). The CC is determined to be a page background CC if the resultant tallied count exceeds a predetermined percentage (e.g., a predetermined percentage of 80%) of the total number of pixels in the CC.

In particular, removing all page background CCs from the selected CCs (106), or more specifically the selected CCs B (306b), guarantees that those CCs are not mistakenly determined to indicate content in subsequent noise reduction steps. By removing all page background CCs, all areas corresponding to page background CCs is excluded from the aforementioned selected protection areas and remain unprotected from the noise reduction.

Figure 3J:
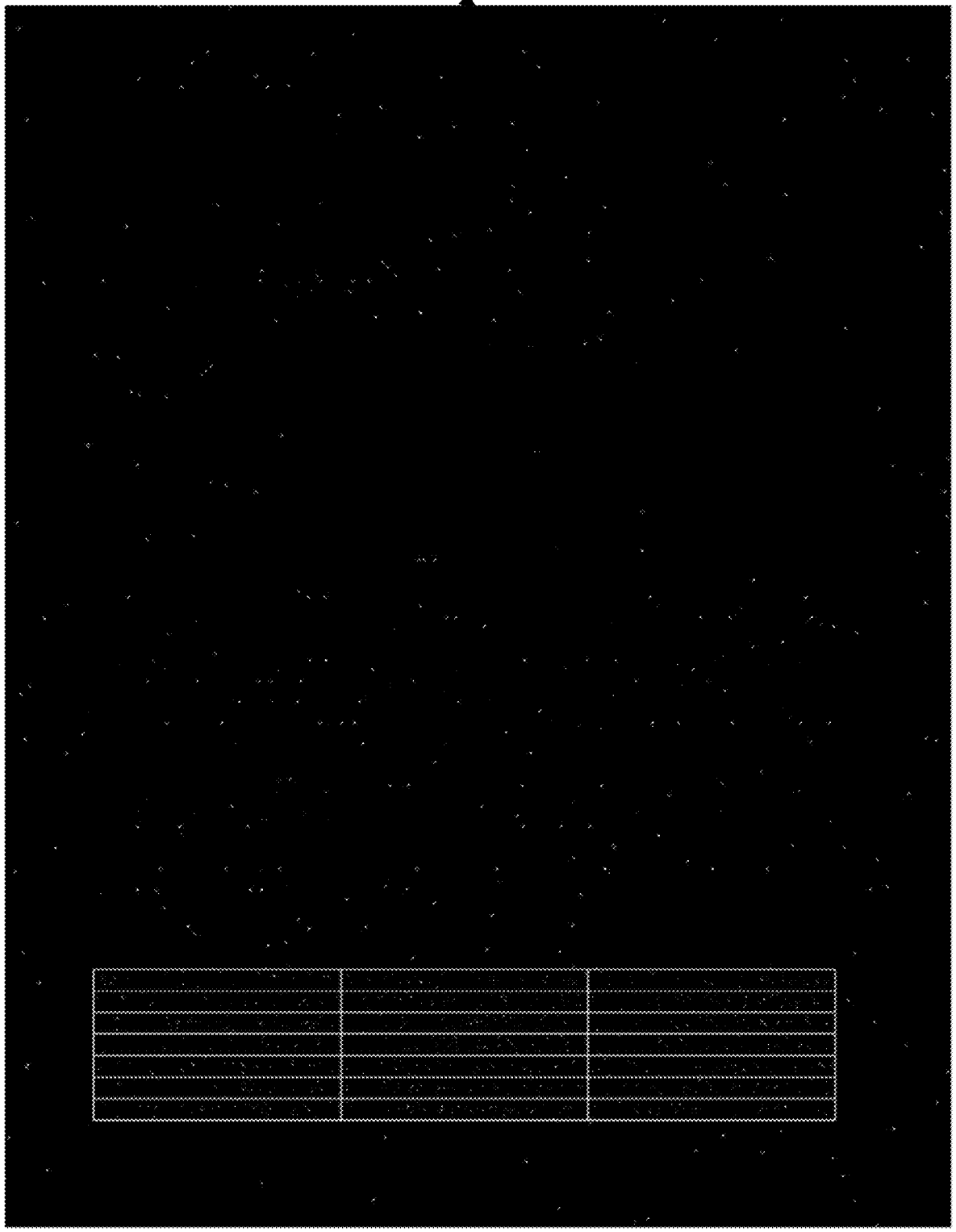

FIG. 3J shows a selected CCs C (306c), which is a still further example of the selected CCs (106) discussed above in reference to FIG. 1. In particular, the selected CCs C (306c) corresponds to the selected CCs B (306b) excluding any CCs representing text characters. In other words, the selected CCs C (306c) corresponds to the combined CCs (305) excluding any CCs that represent natural images, remaining background, or text characters. There are various methods to identify text characters, and corresponding bounding boxes, from the document image (300). The invention is not limited to using any particular method to identify text characters.

An example method may be based on comparing one or more features of each CC to corresponding medians of all CCs. Example features include the width, height, (inferred) stroke width, density or color uniformity of marked pixels within the bounding box of each CC. For example, if a given CC is significantly larger (e.g., 20× larger) in the largest dimension than the median CC, the CC is considered as not corresponding to text. Further, to the extent that the CC is small (e.g., <=50% in the largest dimension compared to the median), but not too small (e.g., >5 pixels in the smallest dimension), the CC is considered to correspond to text. Further, CCs with high color uniformity are more likely to correspond to text. In addition, CCs with fill densities within a given range (e.g., 40% to 60%) are more likely to correspond to text.

Regardless of the method used to infer which CCs correspond to text characters, when identifying the bounding boxes surrounding the text characters, the bounding boxes are scaled up (e.g., scaled up by 150% in all directions) to increase the probability that the bounding boxes completely contain the text areas. This expansion compensates for certain deficiencies in algorithms that find text characters based on CCs. For example, such algorithms may fail to find text characters, or parts of characters, which resemble noise, such as thin lower-case l's and the dots over lower case i's.

Once all CCs corresponding to text characters are identified and corresponding bounding boxes scaled up as described above, all CCs that are fully contained within the scaled bounding boxes are removed from the selected CCs B (306b) to generate the selected CCs C (306c).

The purpose of removing the natural image CCs, page background CCs, and text character CCs from the selected CCs is to allow a first level "cautious" noise reduction to occur on the remaining CCs. The first level noise reduction is the act of excluding from the aforementioned selected protection areas any CCs that is less than a minimum dimension (e.g., a dimension of 2 pixels) in all directions. Very small CCs, at this point in the workflow, are probably noise and remain unprotected from the noise reduction by being excluded from the selected protection area. One possible implementation of determining "very small" is to compare the width, height, and area of each CC to a predetermined minimum dimension (e.g., 2 pixels) or to a calculated maximum based upon the median dimensions of all CCs.

By first removing CCs which correspond to content, any of the remaining CCs that are very small are removed without the risk of removing parts of content. An example of performing the first level noise reduction to narrow down the selected protection area is shown in FIG. 3K below.

Figure 3K:
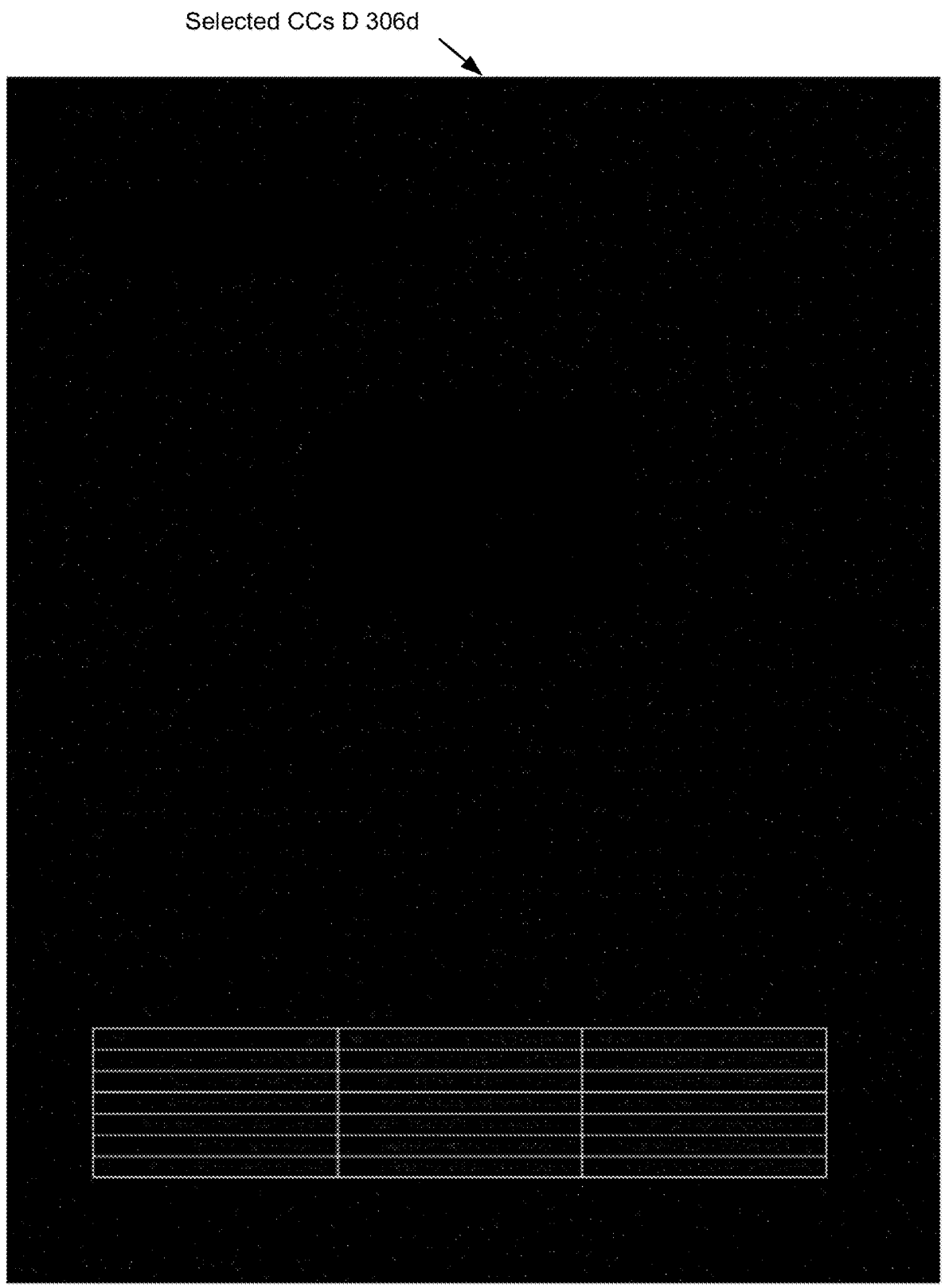
Figure 3L:
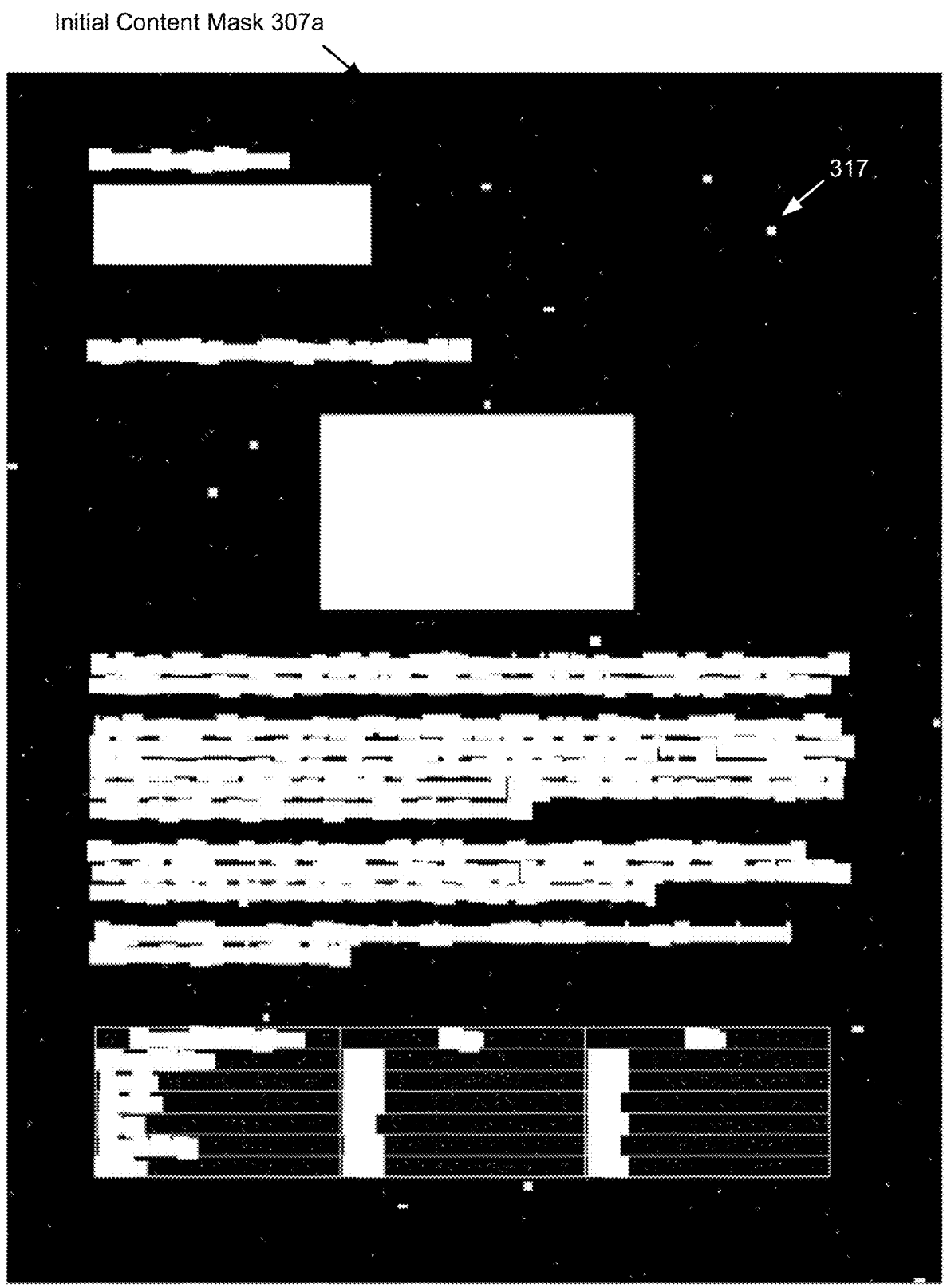
Figure 3M:
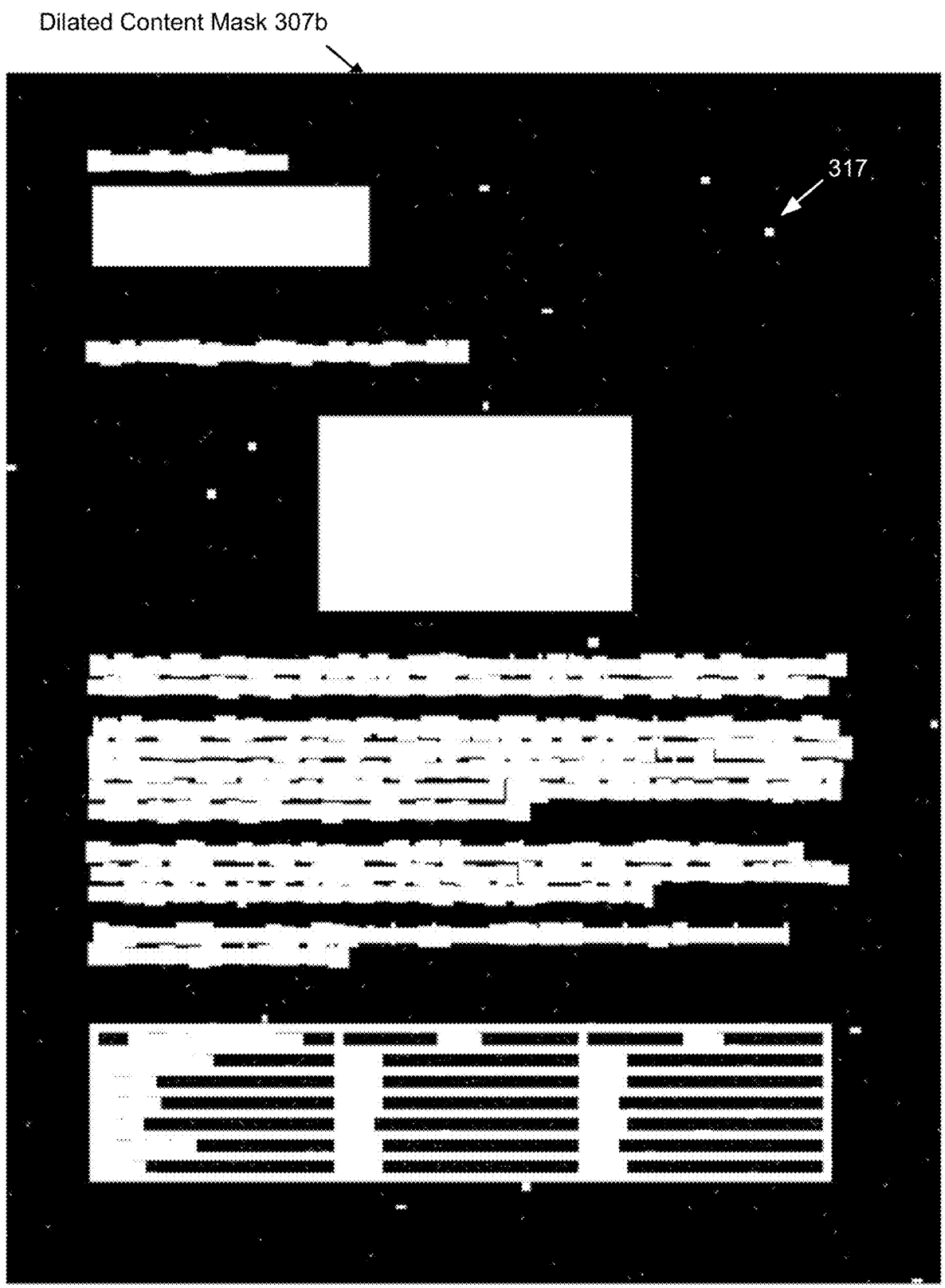
Figure 3N:
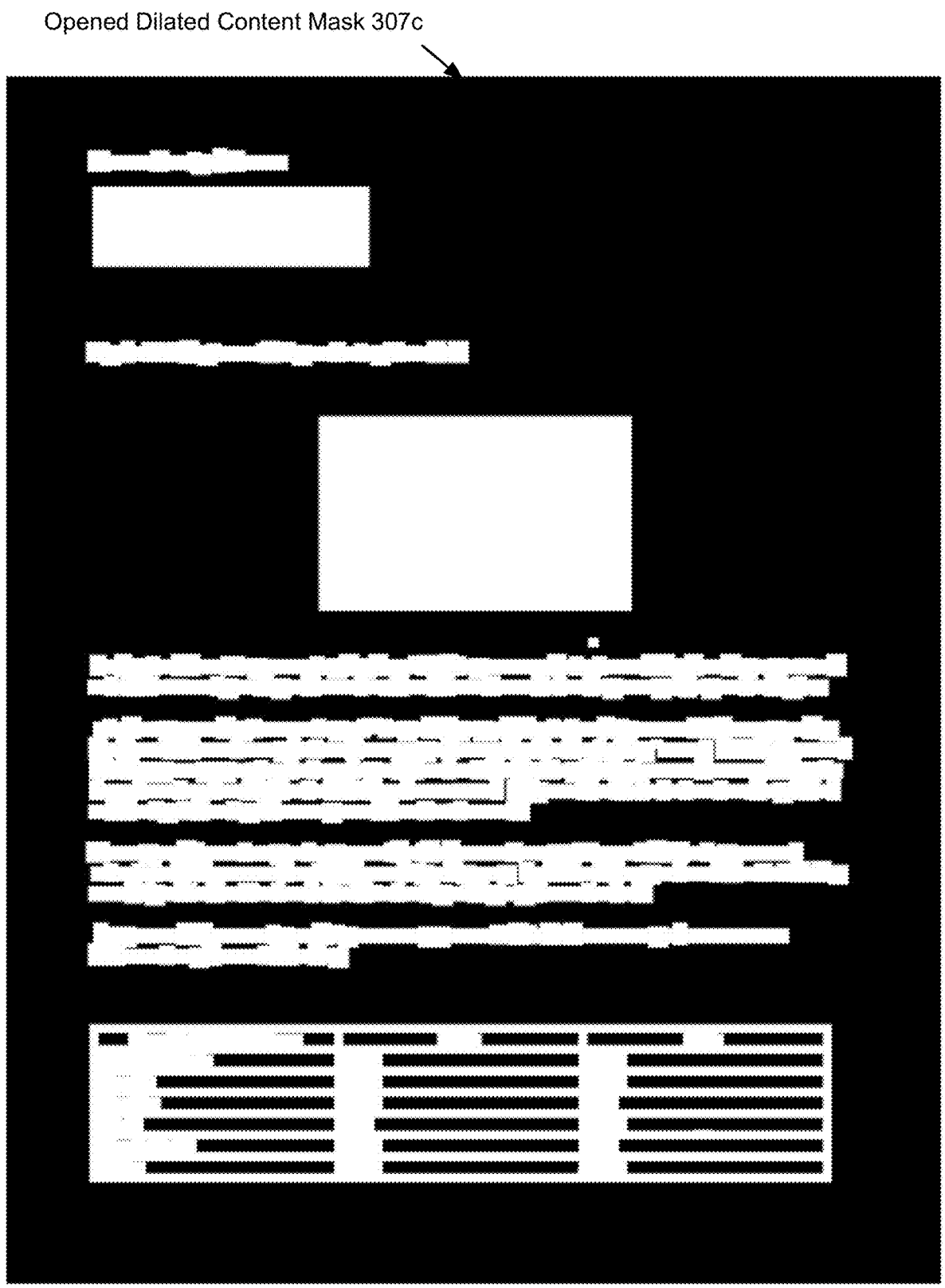

FIG. 3K shows a selected CCs D (306d), which is yet another example of the selected CCs (106) discussed above in reference to FIG. 1. In particular, the selected CCs D (306d) corresponds to the selected CCs C (306c) excluding any CCs that is less than a minimum dimension. In other words, the selected CCs D (306d) corresponds to the combined CCs (305) excluding any CCs that correspond to natural images, remaining background, text characters, or less-than-minimum dimension.

As described above regarding the selected CCs (106) discussed above in reference to FIG. 1, marked pixels in each of the selected CCs A (306a), selected CCs B (306b), selected CCs C (306a), and selected CCs D (306d) indicate areas of content in the original document image that are to be protected during noise reduction process. For example, the selected CCs D (306d) includes primarily the CC that represents gridlines of the table, which is to be protected during noise reduction process. In other words, the selected CCs D (306d) corresponds to the selected protection area in the document image (300). Specifically, the pixels in the selected CCs D (306d) marks the selected protection area in the document image (300).

FIGS. 3L-3R show an example of performing the second level "aggressive" noise reduction of the document image (300) while protecting content based on the text bounding boxes, the natural image bounding boxes, and the selected protection areas. As noted above, the content mask (107) defines a protected portion of the document image (300) enclosed by the text bounding boxes, the natural image bounding boxes, and the selected protection areas that are protected from potential degradation due to the "aggressive" noise reduction. In the example described below, the content mask marks all pixels that are reasonably likely to correspond to content, including some neighboring pixels. Once the content mask is generated, "aggressive" noise reduction, for example by means of a morphological open operation, is applied to the document image (300). The content document image (300) is protected from the morphological open operation because of the protection regions (dilated or expanded as needed) encompassing the protected portion.

FIG. 3L shows an initial content mask (307a), which is an example of the content mask (107) discussed above in reference to FIG. 1. In particular, the initial content mask (307a) contains marked pixels indicating areas of content in the document image (300), and unmarked pixels indicating areas of non-content (background or noise) in the document image (300).

The initial content mask (307a) is generated using step (a) through step (c) below.

(a) Mark all pixels in the initial content mask (307a) that correspond to the areas of a selected CCs, and set all other pixels as unmarked. While the initial content mask (307a) may be generated using any of the selected CCs described above (e.g., selected CCs A (306a), selected CCs B (306b), selected CCs C (306a), selected CCs D (306d)), using the selected CCs D (306d) has the advantage of including the benefit first level noise reduction. In particular, noises corresponding to the aforementioned very small CCs remain unprotected during the second level noise reduction below. If other selected CCs are used, noises corresponding to the aforementioned very small CCs remain to be protected during the second level noise reduction.

(b) Mark all pixels within the areas (i.e., within the bounding boxes) of natural images.

(c) Mark all pixels within the areas (i.e., within the scaled bounding boxes) of text characters.

FIG. 3M shows a dilated content mask (307b), which is a further example of the content mask (107) discussed above in reference to FIG. 1. In particular, the dilated content mask (307b) is based upon initial content mask (307a), but adds a buffer of marked pixels around selected CCs. For example, the gridlines of the table are thicker in the dilated content mask (307b) than the gridlines of the table in the initial content mask (307a).

Noise reduction may be performed on the document image (300) excluding the marked pixels in the initial content mask (307a). However, doing so may destroy certain content because, with the exception of text and images, the contours of the marked pixels of the initial content mask (307a) correspond to the edges of CCs (i.e., edges of content). Noise reduction performed on the document image (300) excluding the marked pixels in the dilated content mask (307b) reduces instances of content being destroyed by noise reduction.

The dilated content mask (307b) is generated using the method of step (a) through step (c) below.

(a) Initialize the dilated content mask (307b) as a copy of the initial content mask (307a).

(b) Identify CCs to dilate.

Note that CCs representing natural images have already been removed from the combined CCs (305) with corresponding areas already marked on the initial content mask (307a). Similarly, the CCs representing text characters have been removed from the combined CCs (305) with corresponding areas within the scaled-up bounding boxes marked on the initial content mask (307a).

Identify, for dilation, each CC having one dimension smaller than a predetermined dilation dimension (e.g., a dimension of 5 pixels) and the other dimension larger than the predetermined dilation dimension. For example, the CC being small in only one dimension may correspond to content that could be degraded or destroyed by noise removal, and therefore is dilated to protect the CC against un-intentional degradation. However, the CC being small in both dimensions is likely noise, and therefore is not protected against removal.

(c) Dilate each CC which is identified for dilation. To dilate the CC means to perform a morphological dilation operation on the pixels in the initial content mask (307a) that are marked by the CC, thereby including pixels lying immediately outside of the region originally marked by the CC.

Once the dilated content mask (307b) is generated, noise reduction is performed on the document image (300). This noise reduction is excluded from the marked pixels in the dilated content mask (307b). The first step to perform noise reduction is to discover noise pixels. There are various methods to discover noise pixels. The invention is not limited to using any particular method to discover noise pixels. An example method to discover noise pixels is described in step (a) through step (c) below.

Figure 3O:
Figure 3P:
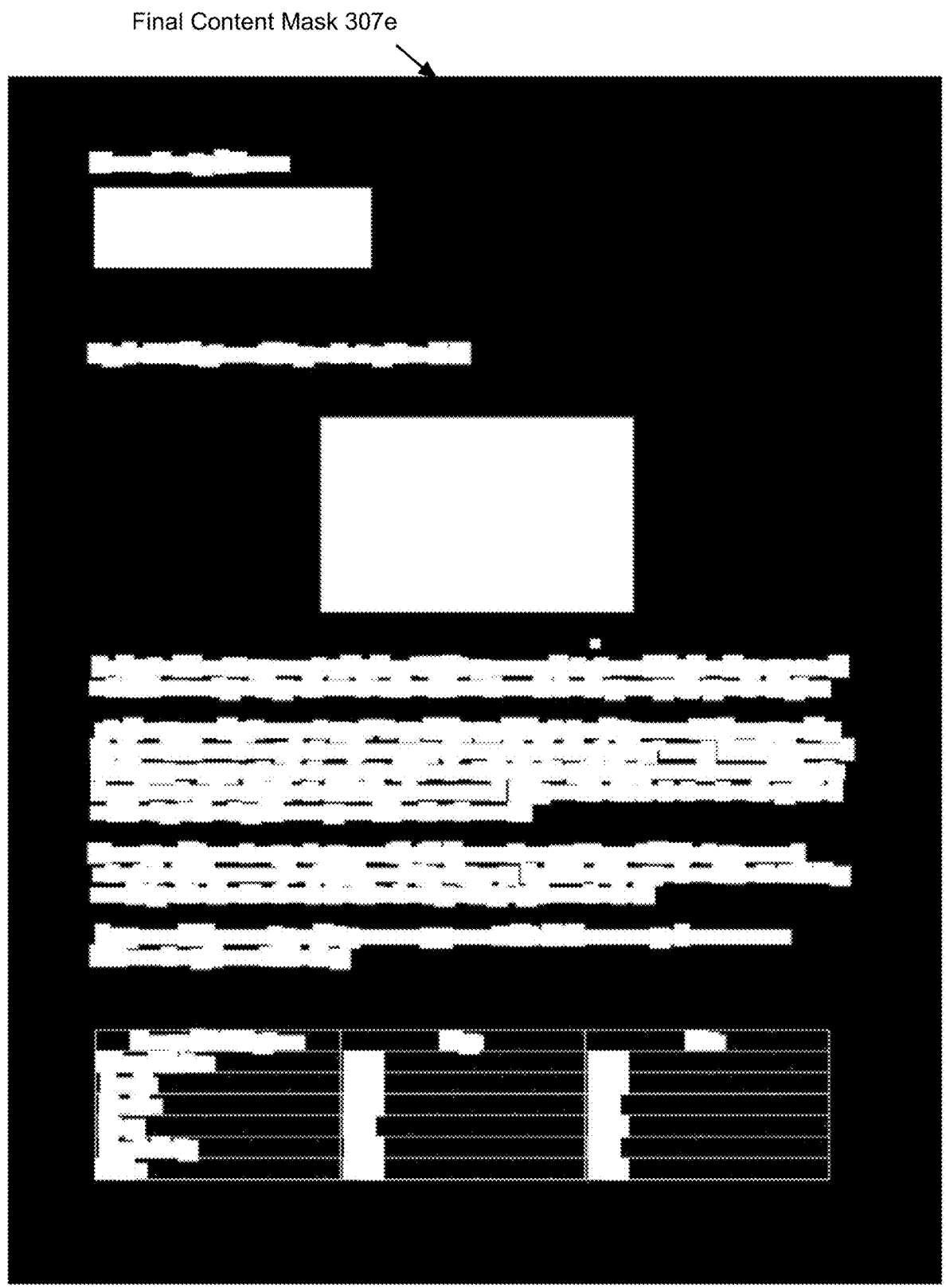

(a) Perform a morphological open operation (i.e., erosion followed by dilation) on the dilated content mask (307b), resulting in the opened dilated content mask (307c) shown in FIG. 3N. The morphological open operation unmarks certain pixels in the dilated content mask (307b), the unmarked pixels are presumably noise. For example, the effect of erosion and dilation may be to eliminate any cluster of pixels which is less than 3 pixels in any dimension. The scattered white dots (e.g., white dot (317)) present in FIGS. 3L and 3M correspond to noise which has been mistaken for text in generating the content mask.) As discussed in reference to FIGS. 1 and 2 above, the areas corresponding to text are scaled up slightly. That's why these white dots are relatively large. These white dots (e.g., white dot (317)) are removed by the morphological open operation and not present in FIG. 3N. Specifically, these white dots (e.g., white dot (317)) are shown in FIG. 3O as pixels to unmark.

(b) Discover which noise pixels were unmarked by the morphological open operation. Calculate the pixel-by-pixel differences between the dilated content mask (307b) and the opened dilated content mask (307c) by using a bitwise XOR operation. Label the difference pixels as the "pixels to unmark," which correspond to the noise pixels. FIG. 3O shows the pixels to unmark (307d) where white pixels were unmarked by the morphological open operation.

(c) Modify the dilated content mask (307b) by setting the pixels corresponding to "pixels to unmark" to the unmarked color. The modified version of the dilated content mask (307b) is used as the final content mask, such as the final content mask (307e) shown in FIG. 3P.

Based on the final content mask (307e), the noise reduction is performed on the document image (300). Specifically, any pixels in the document image (300) that are not marked by the final content mask (307e) are set to the background color. As noted above, the background color is set based on the histogram of all pixel values in the original color image or grayscale image.

Figure 3Q:
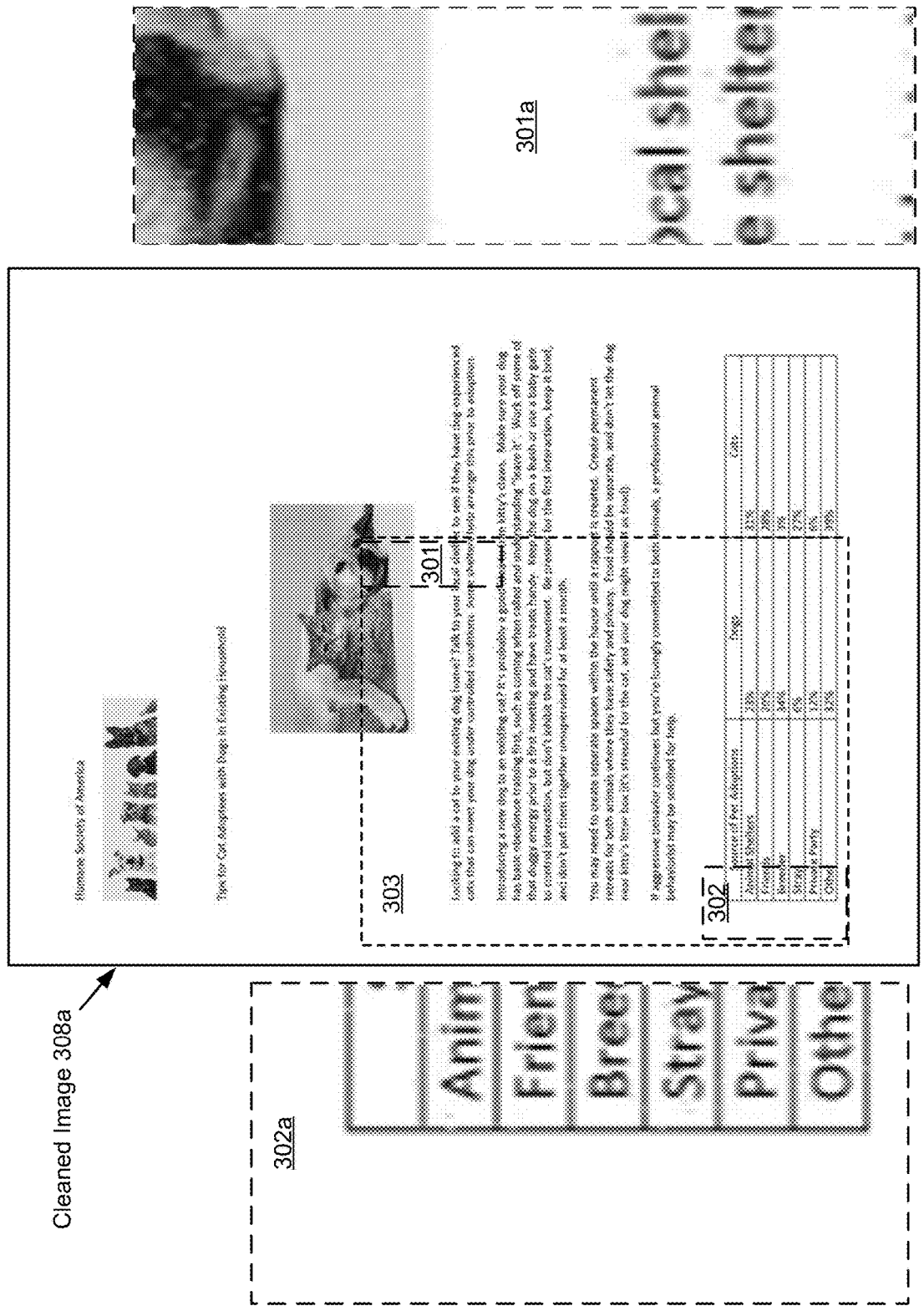

FIG. 3Q shows an example of the noise reduced version of the document image (300) shown in FIG. 3A. As shown in FIG. 3Q, the cleaned image (308a) is the noise reduced version of the document image (300). In particular, the portions (301) and (302) are magnified as the enlarged portions (301a) and (302a), respectively, where it can be seen that the noise (represented by dots (304) in FIG. 3A) are absent in the cleaned image (308a).

Figure 3R:
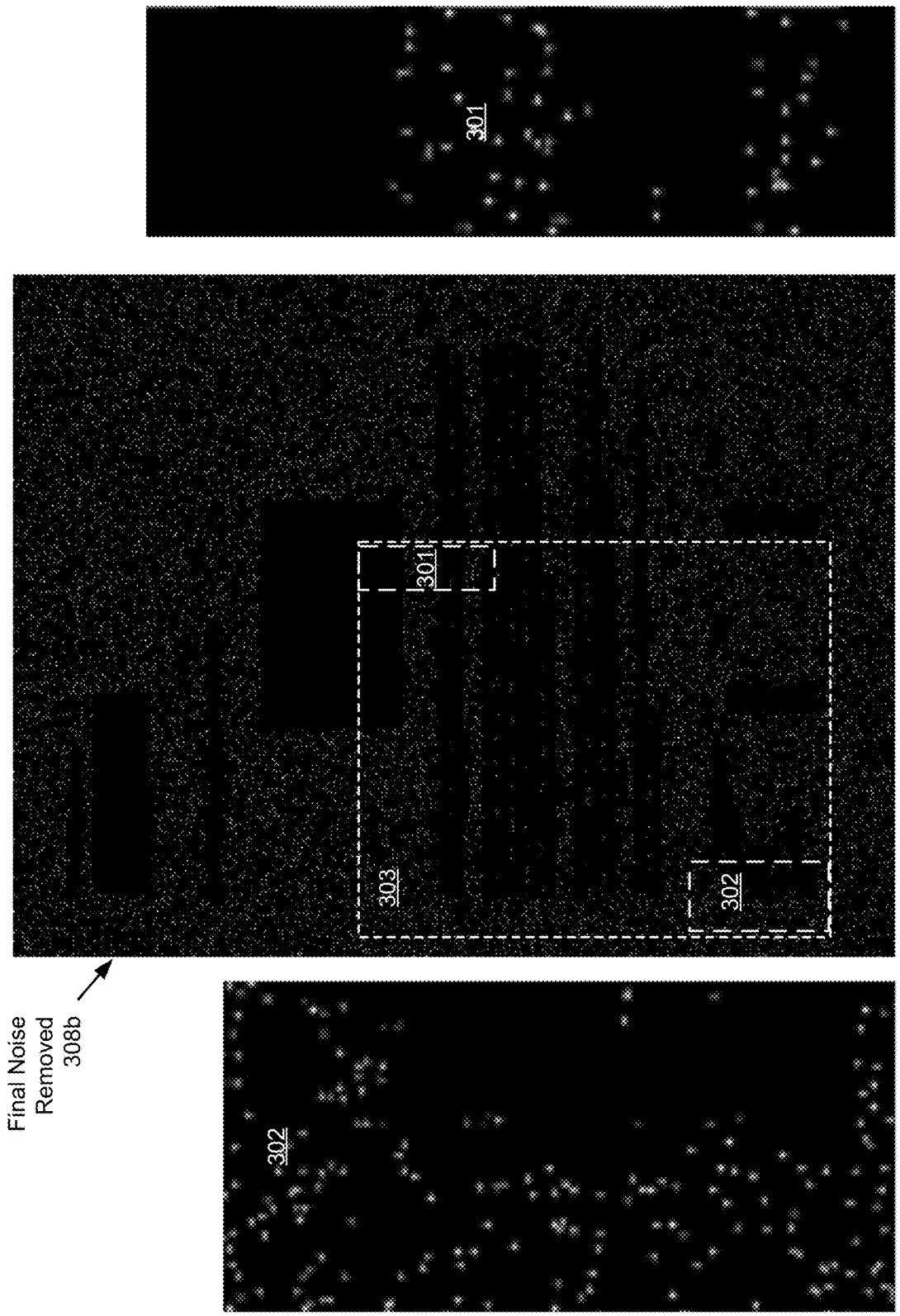

FIG. 3R shows an example of the difference between the cleaned image (308a) and the document image (300), which corresponds to the noise removed (i.e., noise removed (308b)) from the document image (300) in the noise reduction process. Specifically, the white dots scattered over the noise removed (308b) represent noise pixels where the pixel values are converted to the background color in the cleaned image (308a).

Figure 4A:
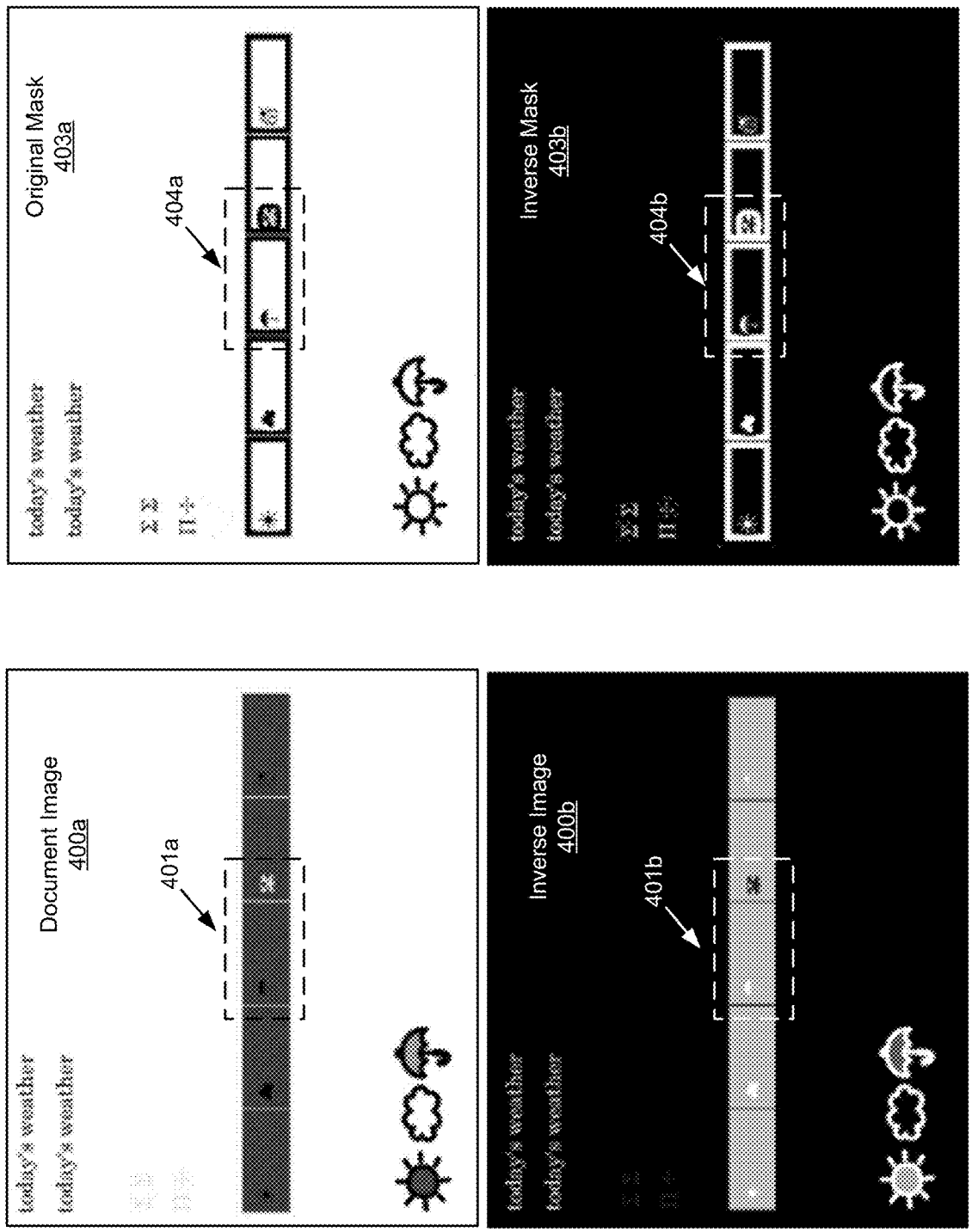
FIGS. 4A-4B show an implementation example in accordance with one or more embodiments of the invention.
Figure 4B:
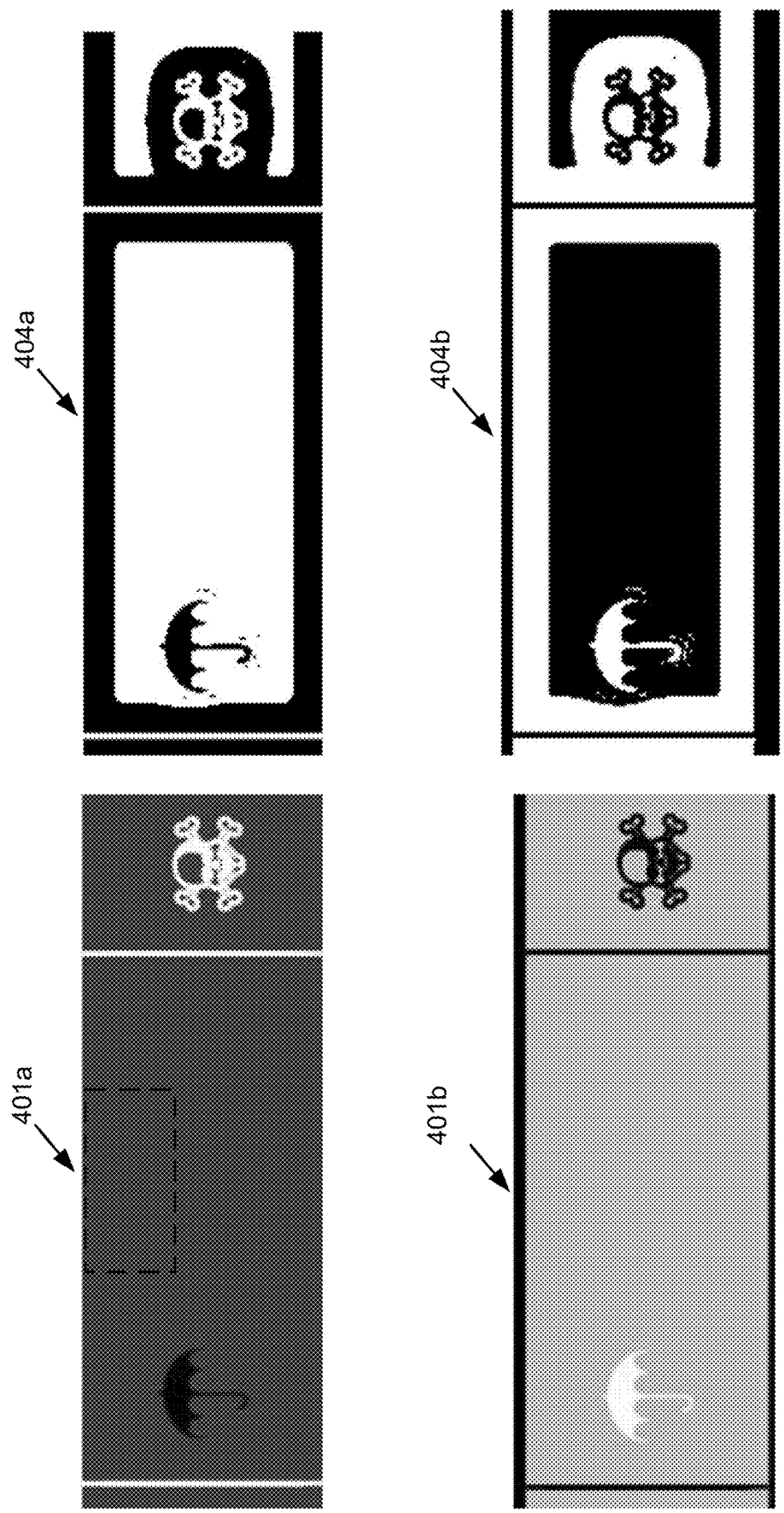

FIG. 4A shows an example of the document image (102), original mask (103a), and inverse mask (103b) discussed above in reference to FIG. 1. In particular, the document image (400a) is an example of the document image (102) that is converted into a grayscale image, and the original mask (403a) is generated from the document image (400a) via adaptive thresholding. In addition, the inverse image (400b) is converted from the document image (400a), and the inverse mask (403b) is generated from the inverse image (400b) via adaptive thresholding. Corresponding regions (401a), (401b), (403a) and (403b) in the document image (4001), inverse image (400b), original mask (403a), and inverse mask (403b), respectively, include dark rectangles and embedded vector graphics that are subject to the noise reduction workflow described above. The regions (401a), (401b), (403a) and (403b) shown in FIG. 4A are shown as enlarged regions on a magnified scale in FIG. 4B for clarity.

As shown in FIG. 4A, five dark rectangles in the document image (400a) are recognized as dark content on light background. For example, consistent with the descriptions in reference to FIGS. 3A-3C above, the dark rectangle in the region (401a) of the document image (400a) are marked white in the corresponding region (404a) in the original mask (403a). Similarly, the edges of the dark rectangle in the region (401a) of the document image (400a) are marked white in the corresponding region (404b) of the inverse mask (403b). In other words, the dark rectangle in the region (401a) of the document image (400a) are marked the same way as the filled areas of the table shown in FIG. 3A. Similarly, the edges of the dark rectangle in the region (401a) of the document image (400a) are marked the same way as the gridlines of the table shown in FIG. 3A. Using the noise reduction workflow described above, the dark rectangle shown in FIG. 4A are protected from noise reduction because the fill color does not match the background color. In contrast, the filled areas of the table shown in FIG. 3A are not protected from noise reduction because the fill color matches the background color. Further, the edges of the dark rectangle shown in FIG. 4A are protected during noise reduction process the same way as the gridlines of the table shown in FIG. 3A above.

Further as shown in FIG. 4A, the skull shaped vector graphics in the document image (400a) is recognized as light content on dark background. For example, consistent with the descriptions in reference to FIGS. 3A-3C above, the stroked traces forming the skull shape in the region (401a) of the document image (400a) are marked white in the corresponding region (404a) in the original mask (403a). Similarly, the filled areas enclosed by the stroked traces in the region (401a) of the document image (400a) are marked white in the corresponding region (404b) of the inverse mask (403b). Using the noise reduction workflow described above, the skull shape is protected during the noise reduction process.

Figure 5:
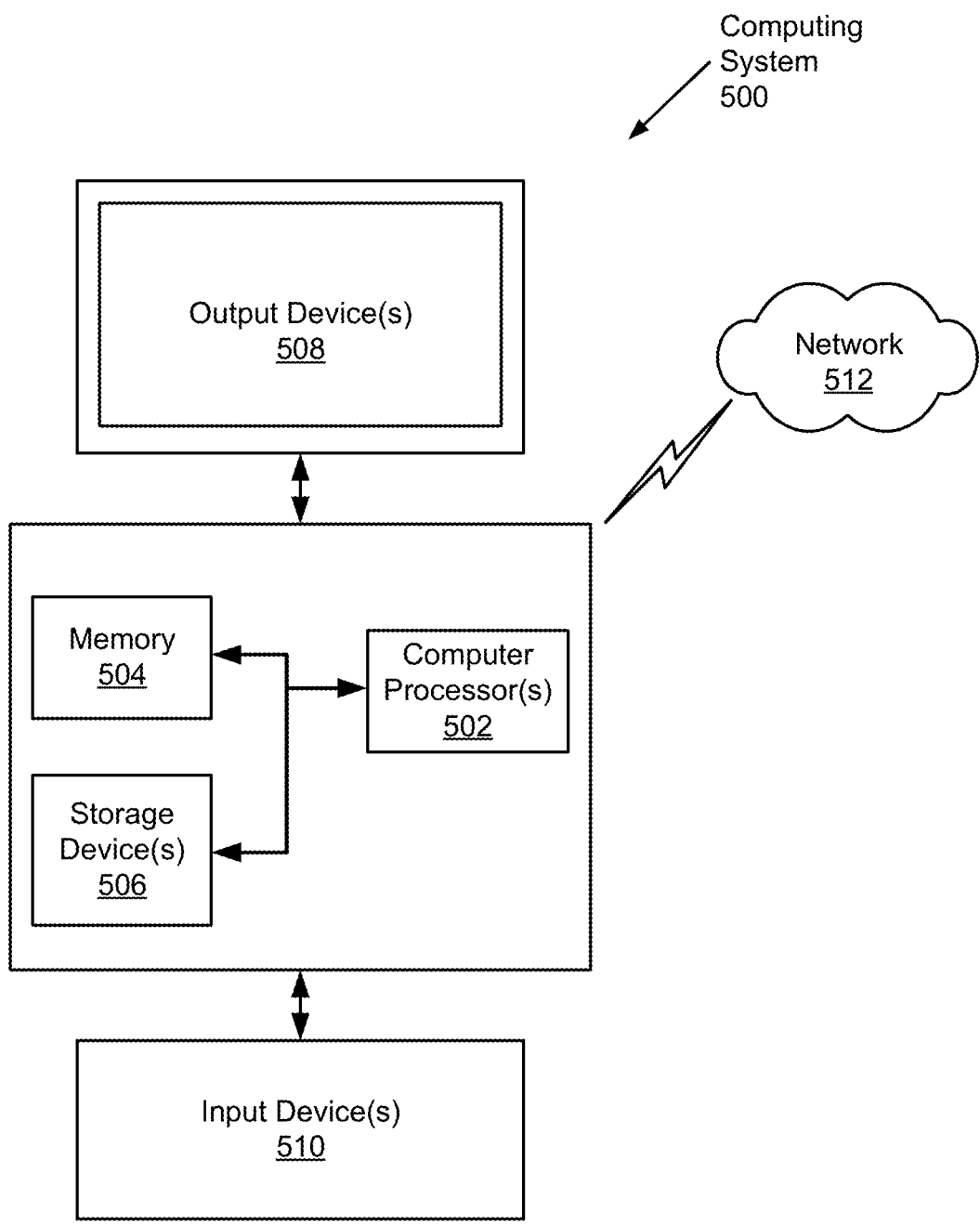
FIG. 5 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and be connected to the other elements over a network (512). Further, one or more embodiments of the invention may be implemented on a distributed system having a plurality of nodes, where each portion of the invention may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

One or more embodiments of the present invention provide the following improvements in electronic document generation and processing technologies: allowing a user to automatically generate an electronic version of a document for which only a physical copy is available, where the electronic version approximates the layout of the physical copy on per paragraph basis; reducing the size of the electronic version by using machine-encoded text to replace image-based content, where corresponding text and image can be cross-referenced based on respective bounding boxes on per paragraph basis; resulting in a compact electronic document that is computer-searchable, where corresponding portion of the physical copy can be highlighted based on the search result; and providing the user a versatile interface whereby the content on the physical copy of the document can be edited in the electronic version or selected into a separate electronic document.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to reduce background noise in a document image, the method comprising:
   generating, by a computer processor and from the document image, an original mask and an inverse mask of the document image;
   extracting, by the computer processor and from the original mask, a plurality of original connected components;
   extracting, by the computer processor and from the inverse mask, a plurality of inverse connected components;
   generating, by the computer processor and based on the plurality of original connected components and the plurality of inverse connected component, a plurality of combined connected components;
   generating, from the plurality of combined connected components and based on a predetermined criterion, a plurality of selected connected components corresponding to a selected protection area of the document image to be excluded from pixel value conversion;
   generating, based at least on the plurality of selected connected components, a content mask for the pixel value conversion;
   identifying, based at least on the content mask, at least one noise pixel;
   generating a final image by at least converting the pixel value of the at least one noise pixel to a uniform background color; and
   outputting the final image.

2. The method of claim 1,
   wherein the document image comprises dark content over light background,
   wherein an inverse connected component of the plurality of inverse components comprises a cluster of pixels corresponding to a particular content portion of the document image, and
   wherein the cluster of pixels is included in at least one of the plurality of selected connected components such that the particular content portion of the document image is excluded from the pixel value conversion.

3. The method of claim 1,
   wherein the document image comprises light content over dark background,
   wherein an original connected component of the plurality of original components comprises a cluster of pixels corresponding to a particular content portion of the document image, and
   wherein the cluster of pixels is included in at least one of the plurality of selected connected components such that the particular content portion of the document image is excluded from the pixel value conversion.

4. The method of claim 1, wherein generating the plurality of selected connected components comprises:
excluding, from the plurality of combined connected components,
a plurality of common connected components corresponding to a common protection area of the document image, and
a plurality of small connected components each having a predetermined size measure less than a predetermined threshold; and
identifying, subsequent to said excluding, a remainder of the plurality of combined connected components as the plurality of the selected connected components,
wherein excluding the plurality of small connected components corresponds to a cautious level of noise reduction.

5. The method of claim 4,
wherein at least a portion of the common protection area corresponds to a text bounding box and/or a natural image bounding box.

6. The method of claim 4, wherein generating the content mask comprises:
marking a first plurality of pixels corresponding to the plurality of common connected components; and
marking a second plurality of pixels corresponding to the plurality of the selected connected components,
wherein the content mask comprises the first plurality of pixels and the second plurality of pixels.

7. The method of claim 6, wherein generating the content mask further comprises:
selecting, from the plurality of common connected components and the plurality of selected components, a target connected component having a first dimension less than a predetermined dilation dimension and a second dimension exceeding the predetermined dilation dimension; and
performing a morphological dilation operation on the content mask to dilate the target connected component.

8. A system for reducing background noise in a document image, the system comprising:
a memory; and
a computer processor connected to the memory and that:
generates, from the document image, an original mask and an inverse mask of the document image;
extracts, from the original mask, a plurality of original connected components;
extracts, from the inverse mask, a plurality of inverse connected components;
generates, based on the plurality of original connected components and the plurality of inverse connected component, a plurality of combined connected components;
generates, from the plurality of combined connected components and based on a predetermined criterion, a plurality of selected connected components corresponding to a selected protection area of the document image to be excluded from pixel value conversion;
generates, based at least on the plurality of selected connected components, a content mask for the pixel value conversion;
identifies, based at least on the content mask, at least one noise pixel;
generates a final image by at least converting the pixel value of the at least one noise pixel to a uniform background color; and
outputs the final image.

9. The system of claim 8,
wherein the document image comprises dark content over light background,
wherein an inverse connected component of the plurality of inverse components comprises a cluster of pixels corresponding to a particular content portion of the document image, and
wherein the cluster of pixels is included in at least one of the plurality of selected connected components such that the particular content portion of the document image is excluded from the pixel value conversion.

10. The system of claim 8,
wherein the document image comprises light content over dark background,
wherein an original connected component of the plurality of original components comprises a cluster of pixels corresponding to a particular content portion of the document image, and
wherein the cluster of pixels is included in at least one of the plurality of selected connected components such that the particular content portion of the document image is excluded from the pixel value conversion.

11. The system of claim 8, wherein generating the plurality of selected connected components comprises:
excluding, from the plurality of combined connected components,
a plurality of common connected components corresponding to a common protection area of the document image, and
a plurality of small connected components each having a predetermined size measure less than a predetermined threshold; and
identifying, subsequent to said excluding, a remainder of the plurality of combined connected components as the plurality of the selected connected components,
wherein excluding the plurality of small connected components corresponds to a cautious level of noise reduction.

12. The system of claim 11,
wherein at least a portion of the common protection area corresponds to a text bounding box and/or a natural image bounding box.

13. The system of claim 11, wherein generating the content mask comprises:
marking a first plurality of pixels corresponding to the plurality of common connected components; and
marking a second plurality of pixels corresponding to the plurality of the selected connected components,
wherein the content mask comprises the first plurality of pixels and the second plurality of pixels.

14. The system of claim 13, wherein generating the content mask further comprises:
selecting, from the plurality of common connected components and the plurality of selected components, a target connected component having a first dimension less than a predetermined dilation dimension and a second dimension exceeding the predetermined dilation dimension; and
performing a morphological dilation operation on the content mask to dilate the target connected component.

15. A non-transitory computer readable medium (CRM) storing computer readable program code for reducing background noise in a document image, wherein the computer readable program code, when executed by a computer, comprises functionality for:
- generating, from the document image, an original mask and an inverse mask of the document image;
- extracting, from the original mask, a plurality of original connected components;
- extracting, from the inverse mask, a plurality of inverse connected components;
- generating, based on the plurality of original connected components and the plurality of inverse connected component, a plurality of combined connected components;
- generating, from the plurality of combined connected components and based on a predetermined criterion, a plurality of selected connected components corresponding to a selected protection area of the document image to be excluded from pixel value conversion;
- generating, based at least on the plurality of selected connected components, a content mask for the pixel value conversion;
- identifying, based at least on the content mask, at least one noise pixel;
- generating a final image by at least converting the pixel value of the at least one noise pixel to a uniform background color; and
- outputting the final image.

16. The CRM of claim 15,
wherein the document image comprises dark content over light background,
wherein an inverse connected component of the plurality of inverse components comprises a cluster of pixels corresponding to a particular content portion of the document image, and
wherein the cluster of pixels is included in at least one of the plurality of selected connected components such that the particular content portion of the document image is excluded from the pixel value conversion.

17. The CRM of claim 15,
wherein the document image comprises light content over dark background,
wherein an original connected component of the plurality of original components comprises a cluster of pixels corresponding to a particular content portion of the document image, and
wherein the cluster of pixels is included in at least one of the plurality of selected connected components such that the particular content portion of the document image is excluded from the pixel value conversion.

18. The CRM of claim 15, wherein generating the plurality of selected connected components comprises:
- excluding, from the plurality of combined connected components,
  - a plurality of common connected components corresponding to a common protection area of the document image, and
  - a plurality of small connected components each having a predetermined size measure less than a predetermined threshold; and
- identifying, subsequent to said excluding, a remainder of the plurality of combined connected components as the plurality of the selected connected components,
wherein excluding the plurality of small connected components corresponds to a cautious level of noise reduction.

19. The CRM of claim 18,
wherein at least a portion of the common protection area corresponds to a text bounding box and/or a natural image bounding box.

20. The CRM of claim 18, wherein generating the content mask comprises:
- marking a first plurality of pixels corresponding to the plurality of common connected components;
- marking a second plurality of pixels corresponding to the plurality of the selected connected components, wherein the content mask comprises the first plurality of pixels and the second plurality of pixels;
- selecting, from the plurality of common connected components and the plurality of selected components, a target connected component having a first dimension less than a predetermined dilation dimension and a second dimension exceeding the predetermined dilation dimension; and
- performing a morphological dilation operation on the content mask to dilate the target connected component.

* * * * *